United States Patent
Takeo

(10) Patent No.: US 9,702,116 B2
(45) Date of Patent: Jul. 11, 2017

(54) SHOVEL WITH ENHANCED ENGINE SPEED MANAGEMENT USING POWER STORAGE DEVICE

(71) Applicant: SUMITOMO (S.H.I.) CONSTRUCTION MACHINERY CO., LTD., Tokyo (JP)

(72) Inventor: Jitsutaka Takeo, Chiba (JP)

(73) Assignee: Sumitomo (S.H.I.) Construction Machinery Co., Ltd., Tokyo (JP)

( * ) Notice: Subject to any disclaimer, the term of this patent is extended or adjusted under 35 U.S.C. 154(b) by 0 days.

(21) Appl. No.: 15/228,918

(22) Filed: Aug. 4, 2016

(65) Prior Publication Data

US 2016/0340869 A1    Nov. 24, 2016

Related U.S. Application Data

(63) Continuation of application No. PCT/JP2015/058889, filed on Mar. 24, 2015.

(30) Foreign Application Priority Data

Mar. 31, 2014  (JP) ................................ 2014-074522
Mar. 31, 2014  (JP) ................................ 2014-074526

(51) Int. Cl.
*E02F 9/20*    (2006.01)
*E02F 9/12*    (2006.01)
(Continued)

(52) U.S. Cl.
CPC ............ *E02F 9/2091* (2013.01); *B60K 6/485* (2013.01); *B60L 1/003* (2013.01); *B60L 11/1862* (2013.01);
(Continued)

(58) Field of Classification Search
CPC ......... B60K 6/485; B60K 11/00; B60L 1/003; B60L 11/1862; E02F 9/2091; E02F 9/2095; E02F 9/2075; B60W 10/00
See application file for complete search history.

(56) References Cited

U.S. PATENT DOCUMENTS 7,279,801 B2 *  10/2007  Kagoshima .............. B60K 6/46
                                                                    180/312
7,525,206 B2    4/2009   Kagoshima et al.
(Continued)

FOREIGN PATENT DOCUMENTS

EP        1720244 A1     11/2006
JP     2005-237178 A      9/2005
(Continued)

OTHER PUBLICATIONS

PCT International Search Report and Written Opinion, PCT Application No. PCT/JP2015/058889, Jun. 16, 2015, 9 pages (with English translation of search report).
(Continued)

*Primary Examiner* — John Walters
*Assistant Examiner* — James Triggs
(74) *Attorney, Agent, or Firm* — Fenwick & West LLP

(57) ABSTRACT

A shovel according to an embodiment of the present invention includes an upper swivel body, an engine, a motor generator which can assist the engine, a capacitor, a swiveling electric motor which swivels the upper swivel body, a DC bus which is connected to the motor generator, the capacitor, and the swiveling electric motor, and a controller which controls charging and discharging of the capacitor. In a case where a swiveling operation is performed, the controller drives the swiveling electric motor by discharging
(Continued)

power discharged by the capacitor, and thereafter, drives the swiveling electric motor by power generated by the motor generator.

9 Claims, 20 Drawing Sheets

(51) Int. Cl.
*B60L 1/00* (2006.01)
*B60L 11/18* (2006.01)
*B60W 10/00* (2006.01)
*B60K 6/485* (2007.10)
*E02F 3/32* (2006.01)
*B60L 11/00* (2006.01)

(52) U.S. Cl.
CPC ............ *B60W 10/00* (2013.01); *E02F 9/123* (2013.01); *E02F 9/2075* (2013.01); *E02F 9/2095* (2013.01); *B60L 11/005* (2013.01); *B60L 2200/40* (2013.01); *B60L 2210/40* (2013.01); *B60L 2240/527* (2013.01); *B60L 2240/529* (2013.01); *B60L 2240/545* (2013.01); *B60L 2240/547* (2013.01); *B60L 2240/549* (2013.01); *E02F 3/32* (2013.01); *Y02T 10/7005* (2013.01); *Y02T 10/705* (2013.01); *Y02T 10/7044* (2013.01); *Y02T 10/7241* (2013.01); *Y10S 903/903* (2013.01)

(56) References Cited

U.S. PATENT DOCUMENTS

| 8,612,102 B2 | 12/2013 | Ohhigashi et al. |
| 2007/0187180 A1 | 8/2007 | Kagoshima et al. |
| 2012/0177470 A1 | 7/2012 | Ohhigashi et al. |
| 2012/0300522 A1* | 11/2012 | Tokuyama ............ H01L 25/072 363/131 |

FOREIGN PATENT DOCUMENTS

| JP | 2011-174312 A | 9/2011 |
| JP | 2014-044206 A | 3/2014 |
| WO | WO 2011/145600 A1 | 11/2011 |

OTHER PUBLICATIONS

PCT/JP2015/058889, Jun. 16, 2015, 9 pages (with English translation of search report).

* cited by examiner

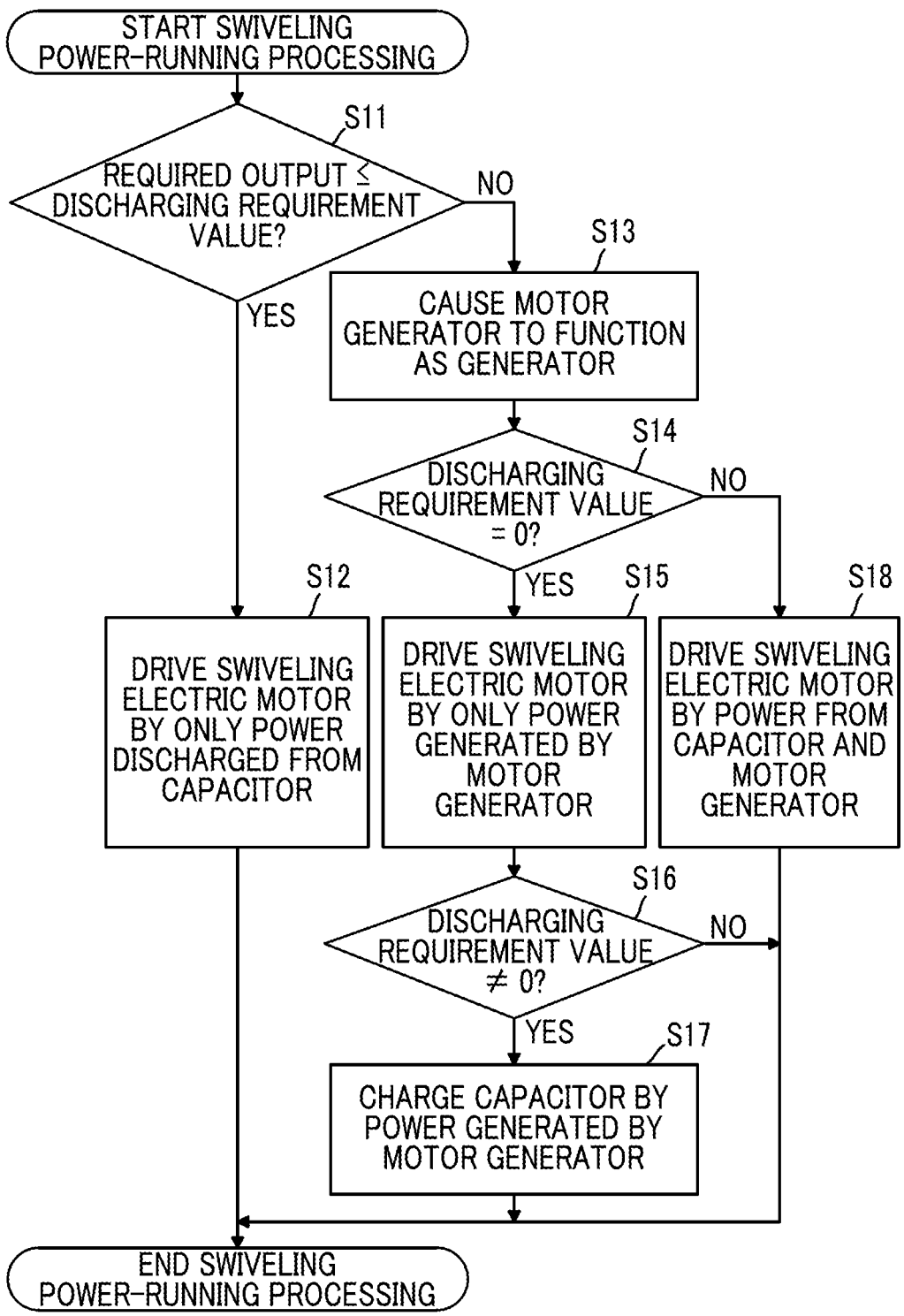

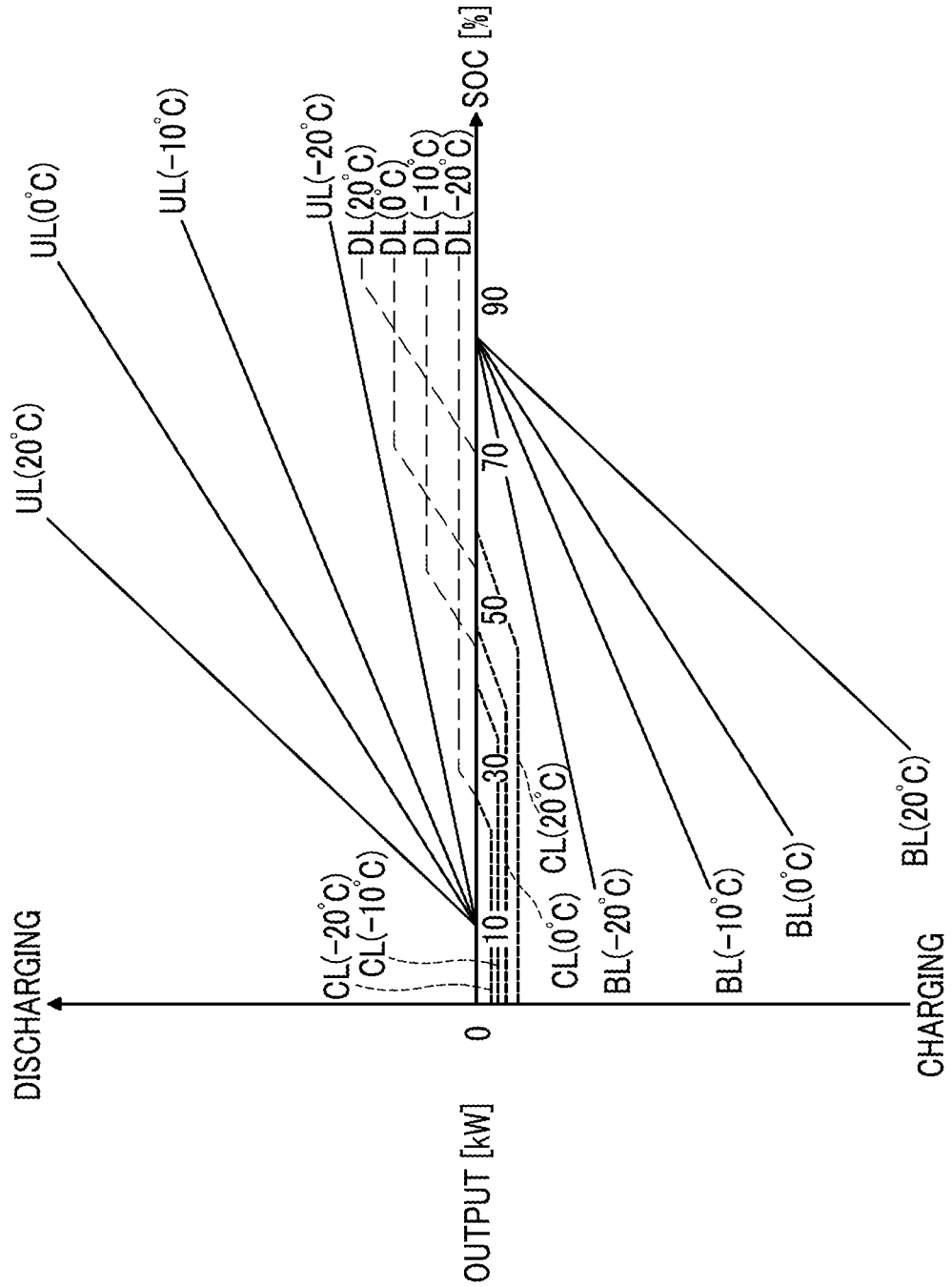

SHOVEL WITH ENHANCED ENGINE SPEED MANAGEMENT USING POWER STORAGE DEVICE

CROSS-REFERENCE TO RELATED APPLICATIONS

This application is a continuation of copending PCT Application No. PCT/JP2015/058889 filed on Mar. 24, 2015, which claims priority to Japanese Patent Application No. 2014-074522 filed on Mar. 31, 2014 and Japanese Patent Application No. 2014-074526 filed on Mar. 31, 2014, which are incorporated by reference herein in their entirety.

BACKGROUND

Technical Field

Certain embodiments of the present invention relate to a shovel which includes a swiveling electric motor and a power storage system.

Description of Related Art

In the related art, a hybrid construction machine is known, which includes a generator and a hydraulic pump which are driven by an engine, a swiveling electric motor which is driven by power generated by the generator, and a hydraulic actuator which is driven by the hydraulic pump. In the hybrid construction machine, in a case where the hydraulic actuator and the swiveling electric motor are simultaneously operated, the hydraulic actuator is driven by the hydraulic pump, and the swiveling electric motor is driven by power generated by the generator. In addition, when the power consumed by the swiveling electric motor is not covered by just the power generated by the generator, power which is accumulated in an electric double-layer capacitor is used. Moreover, when the power consumed by the swiveling electric motor is not covered by the power generated by the generator and the power which can be discharged from the electric double-layer capacitor, the output of the swiveling electric motor is suppressed. The reasons why the suppression is performed are because torque supplied to the hydraulic pump decreases and the speed of the hydraulic actuator decreases in a case where the power generated by the generator increases, and adverse influences of a decrease in the speed of the hydraulic actuator with respect to an operation feeling are greater than adverse influences of a decrease in swivel speed with respect to the operation feeling.

SUMMARY

According to an embodiment of the present invention, there is provided a shovel including: a swivel body; an engine; a motor generator which can assist the engine; a power storage device; a swiveling electric motor which swivels the swivel body; a bus line which is connected to the motor generator, the power storage device, and the swiveling electric motor; and a control device which controls charging and discharging of the power storage device, in which in a case where a swiveling operation is performed, the control device drives the swiveling electric motor by discharging power discharged from the power storage device, and thereafter, drives the swiveling electric motor by power generated by the motor generator.

BRIEF DESCRIPTION OF THE DRAWINGS

FIG. 7B is a flowchart showing a flow of another example of the swiveling power-running processing.
FIG. 16 is a diagram showing still another example of the SOC/requirement value correspondence table.

DETAILED DESCRIPTION

In the related art, even when the output of the swiveling electric motor is suppressed, the operation feeling still deteriorates. Accordingly, it is desirable to provide a shovel in which a swiveling electric motor can be more appropriately driven.

According to embodiments of the present invention, it is possible to provide a shovel in which the swiveling electric motor can be more appropriately driven.

Figure 1:
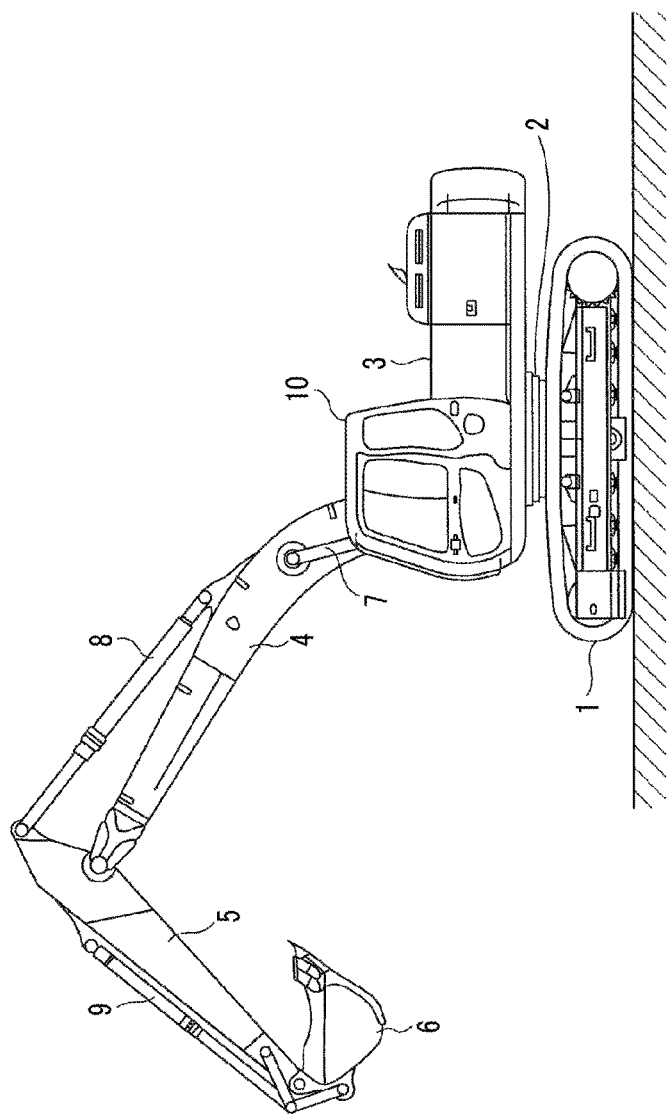
FIG. 1 is a side view of a hybrid shovel.

FIG. 1 is a side view showing a hybrid shovel which is an example of a construction machine to which the present invention is applied.

An upper swivel body 3 is mounted on a lower travelling body 1 of the hybrid shovel via a swivel mechanism 2. A boom 4 is attached to the upper swivel body 3. An arm 5 is attached to the distal end of the boom 4, and a bucket 6 is attached to the distal end of the arm 5. The boom 4, the arm 5, and the bucket 6 configures an excavator attachment which is an example of an operation attachment, and are respectively driven hydraulically by a boom cylinder 7, an arm cylinder 8, and a bucket cylinder 9. A cabin 10 is provided on the upper swivel body 3, and a drive source such as an engine is mounted on the upper swivel body 3.

Figure 2:
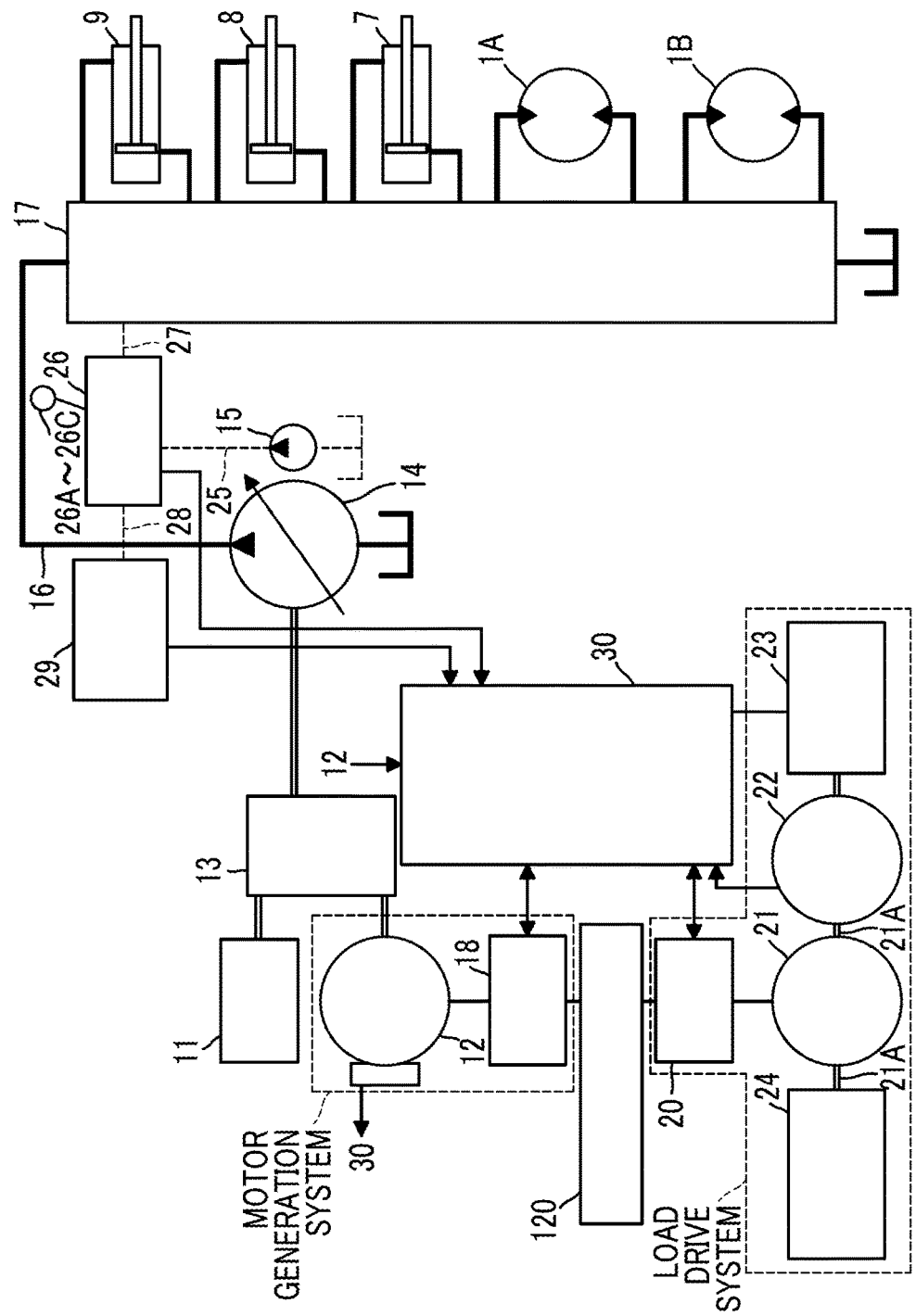
FIG. 2 is a block diagram showing a configuration of a drive system of the hybrid shovel of FIG. 1.

FIG. 2 is a block diagram showing a configuration example of a drive system of the hybrid shovel according to the embodiment of the present invention. In FIG. 2, a mechanical drive system is indicated by double lines, a high pressure hydraulic line is indicated by broken lines, and an electric drive and control system is indicated by thin solid lines.

Each of an engine 11 serving as a mechanical drive section and a motor generator 12 serving as an assist drive section is connected to each of two input shafts of a transmission 13. A main pump 14 and a pilot pump 15 which are hydraulic pumps are connected to an output shaft of the transmission 13. A control valve 17 is connected to the main pump 14 via a high pressure hydraulic line 16.

The control valve 17 is a hydraulic control device which controls a hydraulic system in the hybrid shovel. A hydraulic actuator such as a (right) hydraulic motor 1A and a (left) hydraulic motor 1B for the lower travelling body 1, the boom cylinder 7, the arm cylinder 8, or the bucket cylinder 9 is connected to the control valve 17 via the high pressure hydraulic line. In addition, the hydraulic system includes the (right) hydraulic motor 1A and the (left) hydraulic motor 1B for the lower travelling body 1, the boom cylinder 7, the arm cylinder 8, the bucket cylinder 9, the main pump 14, and the control valve 17.

A power storage system 120 including a capacitor serving as a power storage device is connected to the motor generator 12 via an inverter 18 serving as a motor generator control unit. In addition, a swiveling electric motor 21 serving as a motor-driven operation element is connected to the power storage system 120 via an inverter 20 serving as a motor generator control unit. A resolver 22, a mechanical brake 23, and a swivel transmission 24 are connected to rotary shafts 21A of the swiveling electric motor 21. Moreover, an operation device 26 is connected to the pilot pump 15 via a pilot line 25. The swiveling electric motor 21, the inverter 20, the resolver 22, the mechanical brake 23, and the swivel transmission 24 configure an electrical swivel system which is a load drive system.

The operation device 26 includes a lever 26A, a lever 26B, and a pedal 26C. The lever 26A, the lever 26B, and the pedal 26C are connected to each of the control valve 17 and a pressure sensor 29 via hydraulic lines 27 and 28. The pressure sensor 29 is connected to a controller 30 which performs a drive control of an electrical system.

Figure 3:
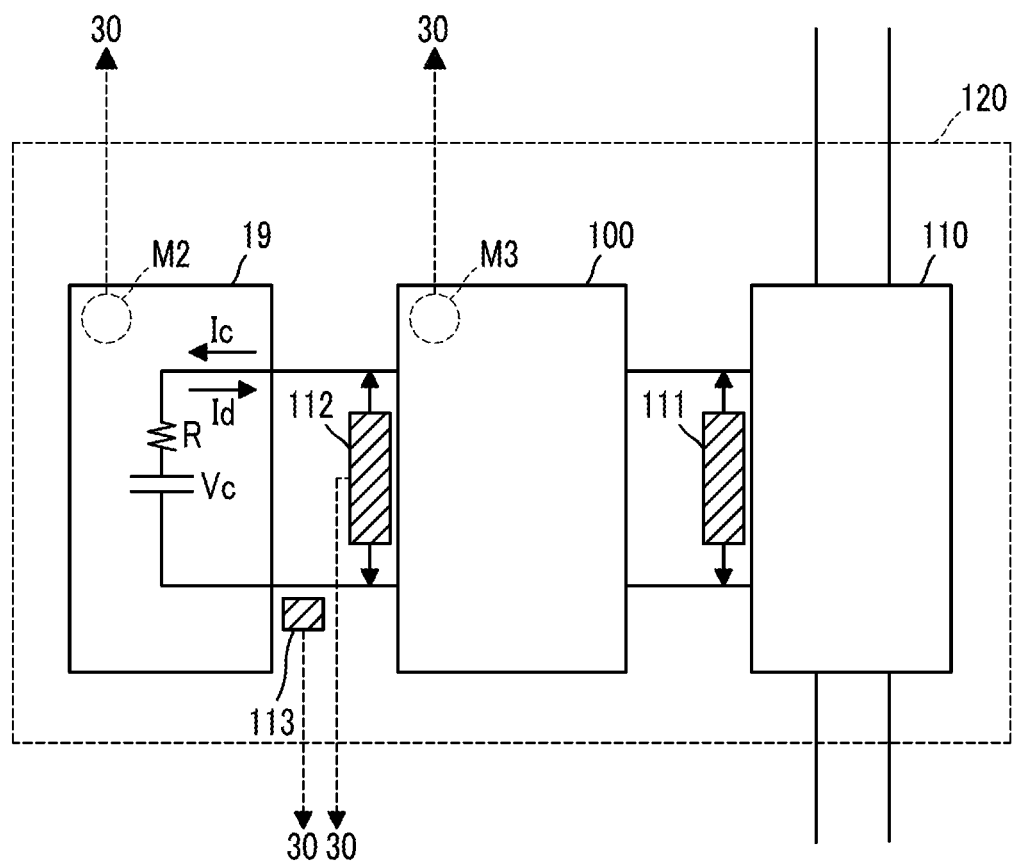
FIG. 3 is a block diagram showing a configuration of a power storage system.

FIG. 3 is a block diagram showing the configuration of the power storage system 120. The power storage system 120 includes a capacitor 19 serving as a first power storage device, a step-up/step-down converter 100, and a DC bus 110 serving as a bus line. In addition, in the present embodiment, the capacitor 19 is a lithium ion capacitor. Moreover, the DC bus 110 serving as a second power storage device controls receiving and transmission of power between the capacitor 19, the motor generator 12, and the swiveling electric motor 21. A capacitor voltage detecting unit 112 for detecting a capacitor voltage value, and a capacitor current detecting unit 113 for detecting a capacitor current value are provided in the capacitor 19. The capacitor voltage value and the capacitor current value detected by the capacitor voltage detecting unit 112 and the capacitor current detecting unit 113 are supplied to the controller 30.

Specifically, the capacitor voltage value is equivalent to a terminal voltage of the capacitor 19. If an open voltage of the capacitor 19 is defined as Vc [V], an internal resistance of the capacitor 19 is defined as R [Ω], and a magnitude of a discharging current which flows from the capacitor 19 to the step-up/step-down converter 100 is defined as Id [A], a terminal voltage V1 at the time of discharging of the capacitor 19 is represented by V1=Vc−R×Id, and discharging power W1 of the capacitor 19 is represented by W1=V1×Id. In addition, if a magnitude of a charging current which flows the step-up/step-down converter 100 to the capacitor 19 is defined as Ic, a terminal voltage V2 at the time of charging of the capacitor 19 is represented by V2=Vc+R×Ic, and charging power W2 of the capacitor 19 is represented by W2=V2×Ic.

In addition, a heating value Q1 at the time of discharging of the capacitor 19 is represented by Id2×R, and a heating value Q2 at the time of charging is represented by Ic2×R.

Moreover, if the minimum voltage of the capacitor 19 is defined as Vmin and the maximum voltage thereof is defined as Vmax, a state-of-charge (SOC) of the capacitor 19 is represented by the following Expression.

$$SOC = \frac{Vc^2 - V\min^2}{V\max^2 - V\min^2} \times 100[\%] \qquad \text{[Expression 1]}$$

From the above-described relationships, the SOC of the capacitor 19 increasing means that the open voltage Vc increases and in a case where a predetermined discharging power W1 is realized, since the heating value Q1 at the time of discharging decreases as the discharging current Id decreases, it is found that discharging efficiency increases. Similarly, in a case where a predetermined charging power W2 is realized, since the heating value Q2 at the time of charging decreases as the charging current Ic decreases, it is found that discharging efficiency increases.

In addition, a temperature sensor M2 serving as a temperature detection unit for detecting a temperature (capacitor temperature) of the capacitor 19 is provided in the capacitor 19. A temperature sensor M3 serving as temperature detection unit for detecting the temperature of the step-up/step-down converter 100 is provided in the step-up/step-down converter 100. For example, each of the temperature sensors M2 and M3 is configured of a thermistor, and outputs each detection value to the controller 30. The capacitor temperature may be indirectly detected by detecting the temperature of a cooling water which is used to cool the capacitor 19.

The step-up/step-down converter 100 controls switching between a step-up operation and a step-down operation such that a DC bus voltage value is within a predetermined range according to operation states of the motor generator 12 and the swiveling electric motor 21. The DC bus 110 is disposed between each of the inverters 18 and 20 and the step-up/step-down converter 100, and transmits and receives power among the capacitor 19, the motor generator 12, and the swiveling electric motor 21.

The controller 30 is a control device which is a main control unit which controls driving of the hybrid shovel. In the present embodiment, the controller 30 is configured of a calculation processing device including a CPU and an internal memory, and carries out programs for driving and control stored in the internal memory by the CPU to realize various functions.

The controller 30 converts signals supplied from the pressure sensor 29 into speed commands, and controls driving of the swiveling electric motor 21. The signals supplied from the pressure sensor 29 are equivalent to signals which indicate the operation amount in a case where the operation device 26 is operated to swivel the swivel mechanism 2.

In addition, the controller 30 performs an operation control (switching between a motor-driven (assist) operation and a power-generation operation) of the motor generator 12, and performs charging and discharging controls of the capacitor 19 by controlling the driving of the step-up/step-down converter 100 serving as a step-up/step-down control unit. The controller 30 performs a switching control between a step-up operation and a step-down operation of the step-up/step-down converter 100 based on the charging state of the capacitor 19, the operation state (assist operation or power-generation state) of the motor generator 12, and the operation state (power-running operation or regenerative operation) of the swiveling electric motor 21, and thus, performs charging and discharging controls of the capacitor 19.

The switching control between the step-up operation and the step-down operation of the step-up/step-down converter 100 is performed based on a DC bus voltage value detected by the DC bus voltage detecting unit 111, the capacitor voltage value detected by the capacitor voltage detecting unit 112, and the capacitor current value detected by the capacitor current detecting unit 113.

In the above-described configuration, after the power generated by the motor generator 12 serving as an assist motor is supplied to the DC bus 110 of the power storage system 120 via the inverter 18, the power can be supplied to the capacitor 19 via the step-up/step-down converter 100 or supplied to the swiveling electric motor 21 via the inverter 20. In addition, after the regenerative power is generated by the regenerative operation of the swiveling electric motor 21 is supplied to the DC bus 110 of the power storage system 120 via the inverter 20, the regenerative power can be supplied to the capacitor 19 via the step-up/step-down converter 100 or can be supplied to the motor generator 12 via the inverter 18. The power accumulated in the capacitor 19 is supplied to at least one of the motor generator 12 and the swiveling electric motor 21 via the step-up/step-down converter 100 and the DC bus 110. In addition, in the present embodiment, the swiveling electric motor 21 preferentially uses the power accumulated in the capacitor 19 and secondarily uses the power generated by the motor generator 12.

Figure 4:
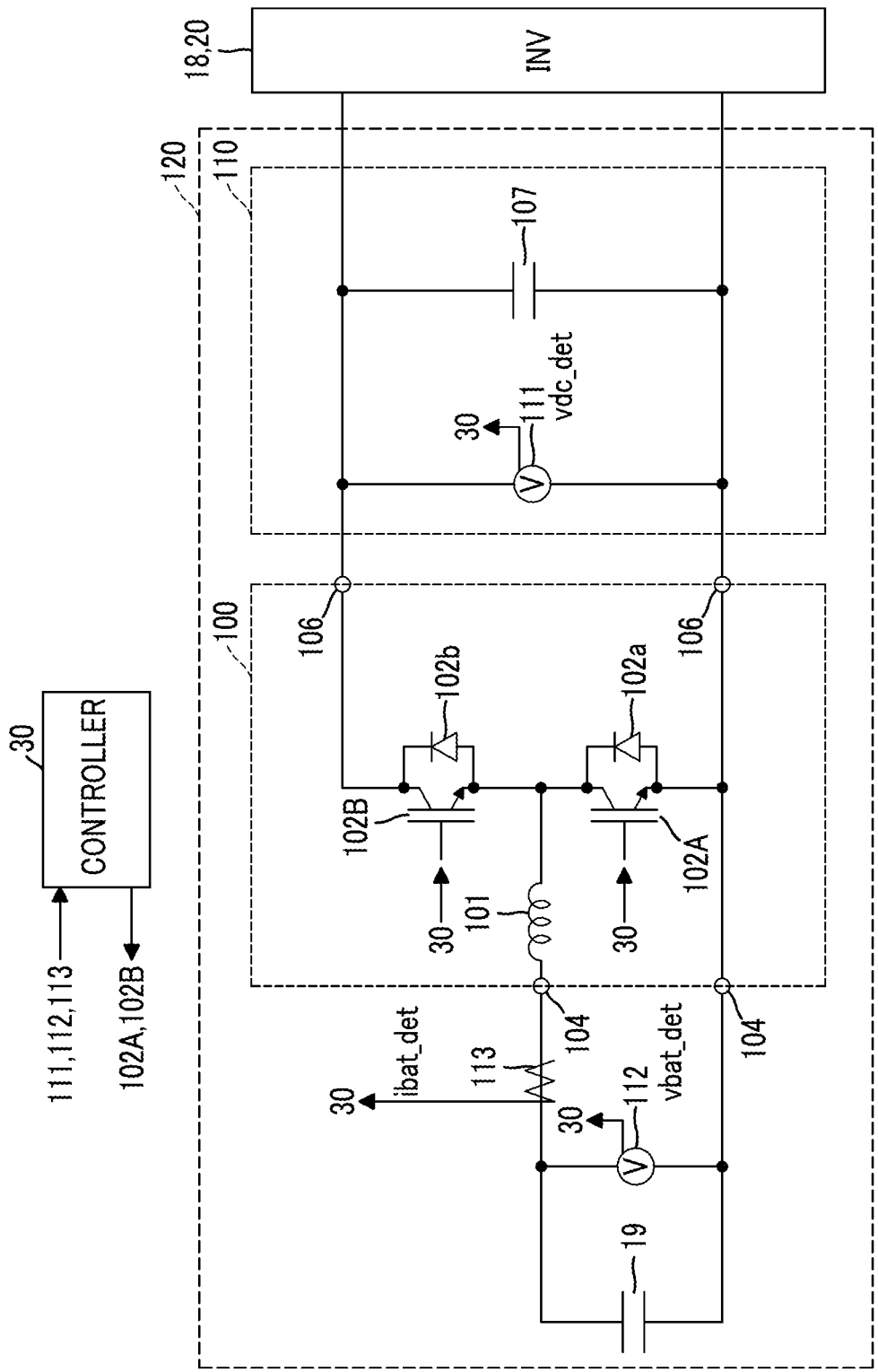
FIG. 4 is a circuit diagram of the power storage system.

FIG. 4 is a circuit diagram of the power storage system 120. The step-up/step-down converter 100 includes a reactor 101, a step-up IGBT 102A, a step-down IGBT 102B, power source connection terminals 104 for connecting the capacitor 19, a pair of output terminals 106 for connecting the inverters 18 and 20, and a smoothing capacitor 107 which is inserted into the pair of output terminals 106 in parallel. Portions between the pair of output terminals 106 of the step-up/step-down converter 100 and the inverters 18 and 20 are connected to each other by the DC bus 110.

One end of the reactor 101 is connected to an intermediate point between the step-up IGBT 102A and the step-down IGBT 102B, and the other end thereof is connected to the power source connection terminal 104. The reactor 101 is provided to supply an induced electromotive force generated by ON/OFF of the step-up IGBT 102A to the DC bus 110.

Each of the step-up IGBT 102A and the step-down IGBT 102B is configured of a bipolar transistor in which MOSFET is incorporated into a gate portion, and is a semiconductor element in which switching can be performed with high power and high speed. The controller 30 applies a PWM voltage to a gate terminal, and thus, the step-up IGBT 102A and the step-down IGBT 102B are driven. Diodes 102a and 102b which are rectifier elements are connected to the step-up IGBT 102A and the step-down IGBT 102B in parallel.

The capacitor 19 may be a chargeable/dischargeable power storage device to transmit and receive power between the capacitor 19 and the DC bus 110 via the step-up/step-down converter 100. In addition, in FIG. 4, the capacitor 19 is shown as the power storage device. However, instead of the capacitor 19, a chargeable/dischargeable secondary battery such as a lithium ion battery, a lithium ion capacity, or other power sources capable of transmitting and receiving power may be used as the power storage device.

The power source connection terminals 104 and the output terminals 106 may be any terminal as long as the capacitor 19 and the inverters 18 and 20 can be connected to it. The capacitor voltage detecting unit 112 which detects a capacitor voltage is connected to a portion between the pair of power source connection terminals 104. The DC bus voltage detecting unit 111 which detects a DC bus voltage is connected to a portion between the pair of output terminal 106.

The capacitor voltage detecting unit 112 detects a voltage value (vdat_det) of the capacitor 19. The DC bus voltage detecting unit 111 detects a voltage of the DC bus 110 (hereinafter, referred to as a "DC bus voltage": vdc_det). The smoothing capacitor 107 is a power storage element which is inserted into a portion between a positive terminal and a negative terminal of the output terminal 106 to smoothen the DC bus voltage. According to the smoothing capacitor 107, the voltage of the DC bus 110 is maintained to a predetermined voltage. The capacitor current detecting unit 113 is detecting means for detecting a value of a current which flows to the capacitor 19, and includes a current detection resistor. That is, the capacitor current detecting unit 113 detects a current value (ibat_det) which flows to the capacitor 19.

In the step-up/step-down converter 100, when step-up of the DC bus 110 is performed, PWM voltage is applied to the gate terminal of the step-up IGBT 102A, and an induced electromotive force generated in the reactor 101 is supplied to the DC bus 110 via the diode 102b connected to the step-down IGBT 102B in parallel according to ON/OFF of the step-up IGBT 102A. Accordingly, the step-up of the DC bus 110 is performed.

When step-down of the DC bus 110 is performed, PWM voltage is applied to the gate terminal of the step-down IGBT 102B, and a regenerative power supplied via the step-down IGBT 102B is supplied from the DC bus 110 to the capacitor 19.

Accordingly, power accumulated in the DC bus 110 charges the capacitor 19, and step-down of the DC bus 110 is performed.

In addition, in actual, a drive portion which generates PWM signals for driving the step-up IGBT 102A and the step-down IGBT 102B exists between the controller 30 and the step-up IGBT 102A and the step-down IGBT 102B. However, the drive portion is not shown in FIG. 4. The drive portion may be realized by any of an electronic circuit and a calculation processing device.

In the hybrid shovel having the above-described configuration, the controller 30 charges and discharges the capacitor 19 such that the capacitor 19 can maintain a predetermined state-of-charge (SOC). Specifically, the controller 30 maintains the SOC of the capacitor 19 at an appropriate level (for example, 70%) such that overcharging does not occur even when the capacitor 19 receives regenerative power from various electric loads such as the swiveling electric motor 21 or receives the power generated by the motor generator 12 for an object of the capacitor 19 other than the charging.

In addition, the "object of the capacitor 19 other than the charging" includes intentionally applying a load to the engine 11. In addition, by allowing the motor generator 12 to function as a generator at an arbitrary timing and intentionally applying a load to the engine 11, the controller 30 can increase the output of the engine 11 at an arbitrary timing. This is because the engine 11 maintains a predetermined rotating speed in a case where a load increases such that the output increases. Accordingly, the controller 30 instantaneously increases the output of the engine 11 before a hydraulic load is applied to the engine 11, and it is possible to prevent the rotating speed of the engine 11 from decreasing due to shortage in output when the hydraulic load is actually applied. Hereinafter, this function is referred to as "boost before load".

In addition, in the present embodiment, the SOC of the capacitor 19 is calculated based on the capacitor voltage value detected by the capacitor voltage detecting unit 112. However, the SOC of the capacitor 19 may be derived by measuring the internal resistance of the capacitor 19, and may be derived using other known arbitrary methods.

The controller 30 determines a charging requirement value and a discharging requirement value based on a current value of the SOC of the capacitor 19, and controls the charging and discharging of the capacitor 19. In addition, in the present embodiment, the charging requirement value is the maximum value of the generated power which is received by the capacitor 19. Moreover, the discharging requirement value means the maximum value of the power which is supplied to the swiveling electric motor 21 by the capacitor 19. In a case where the charging requirement value is set to a negative value (in the present embodiment, the charging power is set to a negative value and the discharging power is set to a positive value), the controller 30 causes the motor generator 12 to function as a generator. In addition, the controller 30 causes the motor generator 12 to generate power at an output equal to or more than the power equivalent to the charging requirement value, and charges the capacitor 19 by the power equivalent to the charging requirement value. In addition, in a case where the charging requirement value is zero, the controller 30 does not charge the capacitor 19. Accordingly, the motor generator 12 does not function as a generator so as to charge only the capacitor 19. Meanwhile, the motor generator 12 functioning as a generator for other objects is not prohibited.

Moreover, in a case where the discharging requirement value is set to a positive value, the controller 30 causes the motor generator 12 to function as an electric motor. In addition, the controller 30 causes the motor generator 12 to perform an assist operation at an output equal to or more than the power equivalent to the discharging requirement value, and discharges the capacitor 19 by the power equivalent to the discharging requirement value. Moreover, in a case where the swiveling electric motor 21 performs a power-running operation, the controller 30 discharges the power of the capacitor 19 toward the swiveling electric motor 21 with power equivalent to the discharging requirement value. In this case, if the output [kW] required for driving the swiveling electric motor 21 is greater than the power equivalent to the discharging requirement value, the controllers 30 cause the motor generator 12 to function as not an electric motor but a generator. This is because the swiveling electric motor 21 is driven by the power generated by the motor generator 12 and the power discharged from the capacitor 19. In addition, in a case where the discharging requirement value is zero, the controller 30 does not discharge the capacitor 19. Accordingly, the motor generator 12 does not function as the electric motor and the power of the capacitor 19 is not discharged toward the swiveling electric motor 21 only to discharge the capacitor 19.

Figure 5:
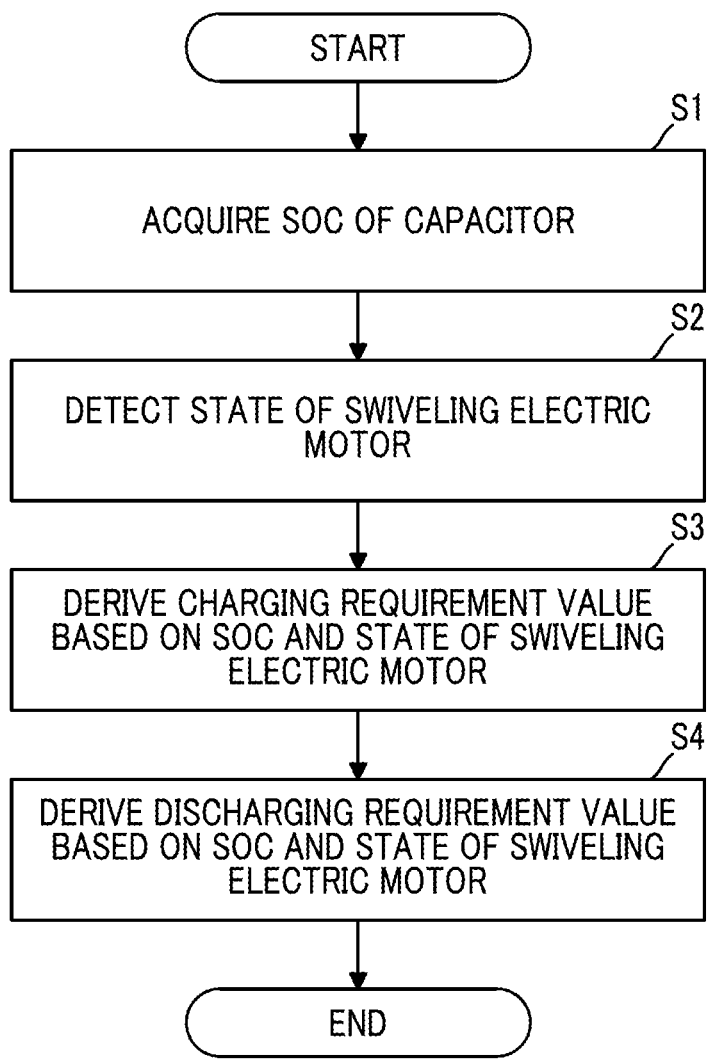
FIG. 5 is a flowchart showing a flow of requirement value deriving processing.

Here, with reference to FIG. 5, processing (hereinafter, referred to as "requirement value deriving processing") for the controller 30 deriving the charging requirement value and the discharging requirement value based on the SOC of the capacitor 19 will be described. In addition, FIG. 5 is a flowchart showing the flow of the requirement value deriving processing, and the controller 30 repeatedly performs the requirement value deriving processing at a predetermined control period.

First, the controller 30 acquires the SOC of the capacitor 19 (Step S1). In the present embodiment, the controller 30 calculates the SOC based on the capacitor voltage value detected by the capacitor voltage detecting unit 112 and the capacitor current value detected by the capacitor current detecting unit 113.

In addition, the controller 30 detects the state of the swiveling electric motor 21 (Step S2). In the present embodiment, the controller 30 determines an operation state and a stop state of the swiveling electric motor 21 from the swivel speed which is calculated based on the output of the resolver 22. Moreover, the controller 30 determines a power-running operation state and a regeneration operation state of the swiveling electric motor 21 from swivel torque which is calculated based on the current flowing through the inverter 20 and the swivel speed.

In addition, Step S1 and Step S2 are in no particular order, the controller 30 may acquire the SOC of the capacitor 19 after detecting the state of the swiveling electric motor 21, and the controller 30 may simultaneously perform two processing.

Thereafter, the controller 30 derives the charging requirement value based on the SOC of the capacitor 19 and the state of the swiveling electric motor 21 (Step S3). In the present embodiment, the controller 30 derives the charging requirement value based on the current SOC and the current state of the swiveling electric motor 21 with reference to a SOC/requirement value correspondence table stored in an internal memory.

In addition, the controller 30 derives the discharging requirement value based on the SOC of the capacitor 19 and the state of the swiveling electric motor 21 (Step S4). In the present embodiment, the controller 30 derives the discharging requirement value based on the current SOC and the current state of the swiveling electric motor 21 with reference to the SOC/requirement value correspondence table which is used in the case where the charging requirement value is derived by controller 30.

Figure 6:
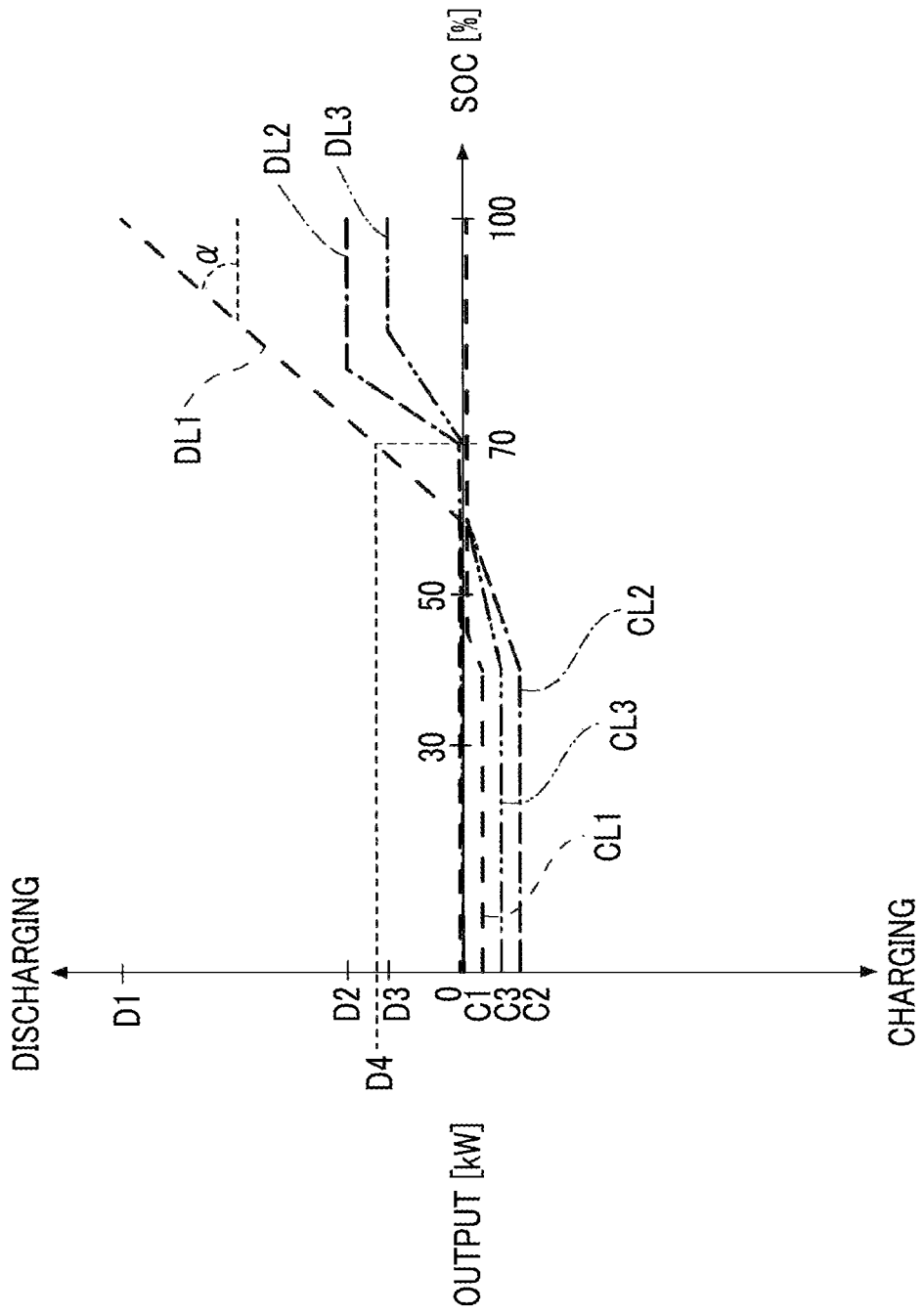
FIG. 6 is a diagram explaining an example of a SOC/requirement value correspondence table.

FIG. 6 is a diagram showing an example of the SOC/requirement value correspondence table. Specifically, FIG. 6 is a graph showing a relationship among the SOC, the discharging requirement value, and the charging requirement value of the capacitor 19, a horizontal axis indicates the SOC[%], and a vertical axis indicates the requirement values. In addition, in FIG. 6, the discharging requirement value is a positive value, and the charging requirement value is a negative value.

Moreover, the charging requirement value of FIG. 6 is a value for allowing the motor generator 12 to function as a generator in order to charge the capacitor 19, and does not require the charging performed by the regenerative power of the swiveling electric motor 21. The regenerative power of the swiveling electric motor 21 is charged in the capacitor 19 separately from the charging of the generated power of the motor generator 12 corresponding to the charging requirement value.

Moreover, a charging requirement line CL1 indicated by a broken line of FIG. 6 shows a transition of the charging requirement value which is adopted in a case where the swiveling electric motor 21 is in the power-running operation state, a charging requirement line CL2 indicated by a dashed line of FIG. 6 shows a transition of the charging requirement value which is adopted in a case where the swiveling electric motor 21 is in the regeneration operation state, and a charging requirement line CL3 indicated by a double-dashed line shows a transition of the charging requirement value which is adopted in a case where the swiveling electric motor 21 is in a stop state.

In addition, a discharging requirement line DL1 indicated by a broken line of FIG. 6 shows a transition of the discharging requirement value which is adopted in a case where the swiveling electric motor 21 is in the power-running operation state, a discharging requirement line DL2 indicated by a dashed line of FIG. 6 shows a transition of the discharging requirement value which is adopted in a case where the swiveling electric motor 21 is in the regeneration operation state, and a discharging requirement line DL3 indicated by a double-dashed line shows a transition of the discharging requirement value which is adopted in a case where the swiveling electric motor 21 is in the stop state.

Specifically, in the charging requirement line CL1, the charging requirement value becomes a value C1 in a case where the SOC is 40[%] or less, gradually approaches zero until the SOC reaches 45[%] after exceeding 40[%], and the charging requirement value becomes zero in a case where the SOC is 45[%] or more. By adopting the charging requirement line CL1, the controller 30 charges the capacitor 19 such that the SOC less than 45[%] becomes 45[%] while the terminal voltage of the capacitor 19 does not exceed the upper limit voltage during swivel power running.

Moreover, in the charging requirement line CL2, the charging requirement value becomes a value C2 in a case where the SOC is 40[%] or less, gradually approaches zero until the SOC reaches 60[%] after exceeding 40[%], and the charging requirement value becomes zero in a case where the SOC is 60[%] or more. By adopting the charging requirement line CL2, the controller 30 charges the capacitor 19 such that the SOC less than 60[%] becomes 60[%] while the terminal voltage of the capacitor 19 does not exceed the upper limit voltage during swivel regeneration.

Moreover, in the charging requirement line CL3, the charging requirement value becomes a value C3 in a case where the SOC is 40[%] or less, gradually approaches zero until the SOC reaches 60[%] after exceeding 40[%], and the charging requirement value becomes zero in a case where the SOC is 60[%] or more. By adopting the charging requirement line CL3, the controller 30 charges the capacitor 19 such that the SOC less than 60[%] becomes 60[%] while the terminal voltage of the capacitor 19 does not exceed the upper limit voltage during stopping of swivel.

In addition, in the discharging requirement line DL1, the discharging requirement value becomes zero in a case where the SOC is 60[%] or less, increases at a constant rate until the SOC reaches 100[%] after exceeding 60[%], and becomes a D1 value in a case where the SOC reaches 100[%]. By adopting the discharging requirement line DL1, the controller 30 discharges the capacitor 19 such that the SOC equal to more than 60[%] becomes 60[%] while the terminal voltage of the capacitor 19 is not less than the lower limit voltage during the swivel power running.

Moreover, in the discharging requirement line DL2, the discharging requirement value becomes zero in a case where the SOC is 70[%] or less, increases at a constant rate until the SOC reaches 80[%] after exceeding 70[%], and becomes a D2 value in a case where the SOC is 80[%] or more. By adopting the discharging requirement line DL2, the controller 30 discharges the capacitor 19 such that the SOC equal to more than 70[%] becomes 70[%] while the terminal voltage of the capacitor 19 is not less than the lower limit voltage during the swivel regeneration.

In addition, in the discharging requirement line DL3, the discharging requirement value becomes zero in a case where the SOC is 70[%] or less, increases at a constant rate until the SOC reaches 85[%] after exceeding 70[%], and becomes a D3 value in a case where the SOC is 85[%] or more. By adopting the discharging requirement line DL3, the controller 30 discharges the capacitor 19 such that the SOC equal to more than 70[%] becomes 70[%] while the terminal voltage of the capacitor 19 is not less than the lower limit voltage during stopping of the swivel.

For example, the graph of FIG. 6 shows that the charging requirement value is zero and the discharging requirement value is D4 if the current SOC of the capacitor 19 is 70[%] and the current state of the swiveling electric motor 21 is in the power-running operation state.

Moreover, the graph of FIG. 6 shows that the charging requirement value is C2 and the discharging requirement value is zero if the current SOC of the capacitor 19 is 30[%] and the current state of the swiveling electric motor 21 is in the regeneration operation state.

Figure 7A:
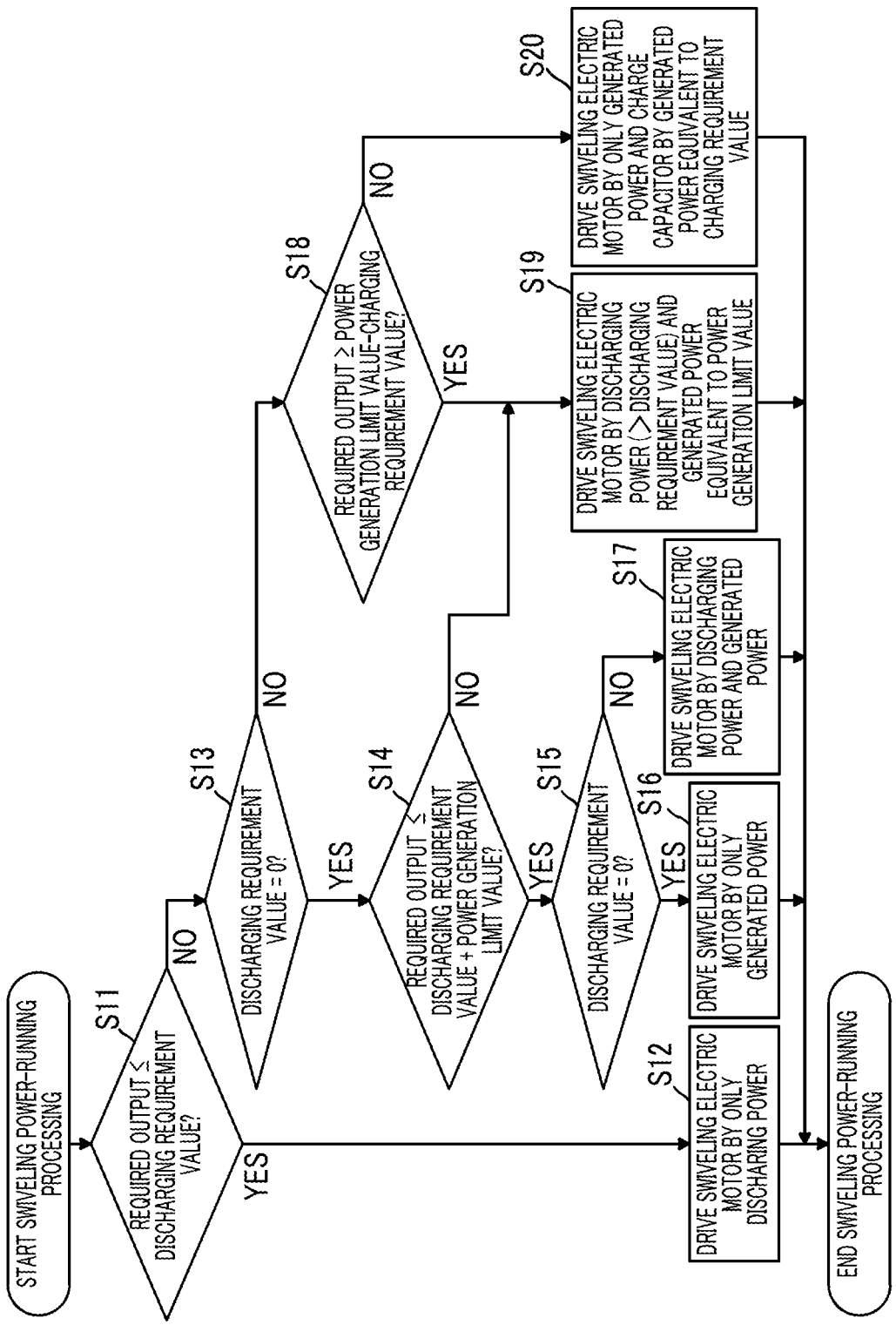
FIG. 7A is a flowchart showing a flow of an example of swiveling power-running processing.

Next, with reference to FIG. 7A, an example of processing (hereinafter, referred to as "swiveling power-running processing") for the controller 30 controlling the charging and discharging of the capacitor 19 using the charging requirement value and the discharging requirement value in the case where the swiveling electric motor 21 is in the power-running operation state will be described. In addition, FIG. 7A is a flowchart showing the flow of an example of the swiveling power-running processing, and in the case where the swiveling electric motor 21 is in the power-running operation state, the controller 30 repeatedly performs the swiveling power-running processing at a predetermined control period. Moreover, the controller 30 may perform the swiveling power-running processing only once when the swivel power running starts.

First, the controller 30 determines that an output (hereinafter, referred to as a "required output") required for the swivel driving of the swiveling electric motor 21 is less than or equal to the discharging requirement value (Step S11). In the present embodiment, the controller 30 derives the required output from the product of the swivel speed calculated based on the output of the resolver 22 and the swivel torque calculated based on the current flowing through the inverter 20. In addition, the controller 30 compares the required output with the discharging requirement value derived by the requirement value deriving processing.

In a case where it is determined that the required output is less than or equal to the discharging requirement value (YES in Step S11), the controller 30 drives the swiveling electric motor 21 by only the power (discharging power) discharged by the capacitor 19 (Step S12). Specifically, when the required output is low as the initial step of the power-running operation, the controller 30 drives the swiveling electric motor 21 by only the discharging power.

Meanwhile, in a case where it is determined that the required output is greater than the discharging requirement value (NO in Step S11), the controller 30 determines whether or not the charging requirement value is zero (Step S13). In the present embodiment, the controller 30 determines whether or not the charging requirement value is zero with reference to the charging requirement value which is derived by the requirement value deriving processing. Moreover, the charging requirement value being zero means that the charging of the capacitor 19 stops.

In a case where it is determined that the charging requirement value is zero (YES in Step S13), the controller 30 determines whether or not the required output is less than or equal to the sum of the discharging requirement value and a power generation limit value (Step S14). In addition, the power generation limit value means the maximum value of the power which can be generated by the motor generator 12.

In a case where it is determined that the required output is less than or equal to the sum of the discharging requirement value and the power generation limit value (YES in Step S14), the controller 30 determines whether or not the discharging requirement value is zero (Step S15). Moreover, the discharging requirement value being zero means that the discharging of the capacitor 19 stops.

In a case where it is determined that the discharging requirement value is zero (YES in Step S15), that is, in a case where the discharging of the capacitor 19 stops, the controller 30 drives the swiveling electric motor 21 by only the power (generated power) generated by the motor generator 12 (Step S16).

In addition, in a case where it is determined that the discharging requirement value is not zero (NO in Step S15), that is, in a case where the discharging of the capacitor 19 does not stop, the controller 30 drives the swiveling electric motor 21 by the discharging power discharged by the capacitor 19 and the power generated by the motor generator 12 (Step S17).

Specifically, the controller 30 increases the generated power while decreasing the discharging power as the SOC decreases. Accordingly, the controller 30 maintains a state where the SOC is high and realizes a relatively high terminal voltage and a relatively low discharging current, and it is possible to obtain high efficiency.

Moreover, in a case where the required output is greater than the sum of the discharging requirement value and the power generation limit value (NO in Step S14), the controller 30 drives the swiveling electric motor 21 by the discharging power which is greater than the discharging power equivalent to the discharging requirement value discharged by the capacitor 19 and the generated power equivalent to the power generation limit value generated by the motor generator 12 (Step S19). This is because it is not possible to supply the required output of the swiveling electric motor 21 by the generated power equivalent to the power generation limit value and the discharging power equivalent to the discharging requirement value.

In addition, in a case where it is determined that the charging requirement value is not zero (NO in Step S13), that is, in a case where the charging of the capacitor 19 does not stop, the controller 30 determines whether or not the required value is equal to or more than a value obtained by subtracting the charging requirement value from the power generation limit value (Step S18).

In a case where it is determined that the required output is equal to or more than the value obtained by subtracting the charging requirement value from the power generation limit value (YES in Step S18), the controller 30 drives the swiveling electric motor 21 by the discharging power which is greater than the discharging power equivalent to the discharging requirement value discharged by the capacitor 19, and the generated power equivalent to the power generation limit value generated by the motor generator 12 (Step S19). This is because the capacitor 19 cannot be discharged in the case where the capacitor 19 is charged by the generated power equivalent to the charging requirement value generated by the motor generator 12 and it is not possible to supply the required output of the swiveling electric motor 21 by only the motor generator 12.

Meanwhile, in a case where the required output is less than the value obtained by subtracting the charging requirement value from the power generation limit value (NO in Step S18), the controller 30 drives the swiveling electric motor 21 by only the power generated by the motor generator 12 and charges the capacitor 19 by the generated power equivalent to the charging requirement value generated by the motor generator 12 (Step S20). That is, the motor generator 12 performs the power generation of the power equivalent to the required output and the power generation of the power equivalent to the charging requirement value.

By repeatedly performing the above-described swiveling power-running processing, as shown in the discharging requirement line DL1 of FIG. 6, in the case where the capacitor 19 indicates the SOC (for example, a value greater than 60%) corresponding to the discharging requirement value which is not zero, if the required output is less than or equal to the discharging requirement value, the controller 30 drives the swiveling electric motor 21 by only the discharging power discharged from the capacitor 19. In addition, in the case where the capacitor 19 indicates the SOC (for example, a value greater than 60%) corresponding to the discharging requirement value which is not zero, if the required output is greater than the discharging requirement value, the controller 30 drives the swiveling electric motor 21 by the discharging power equivalent to the discharging power discharged from the capacitor 19 and the generated power generated by the motor generator 12. In this way, the controller 30 positively charges the capacitor 19 during the swivel power running, and thereafter, can reliably charge the capacitor 19 with the regenerative power generated during the swivel regeneration.

Moreover, in a case where the capacitor 19 indicates the SOC (for example, a value less than or equal to 60%) corresponding to the discharging requirement value which is zero, the controller 30 drives the swiveling electric motor 21 by only the power generated by the motor generator 12. Moreover, in a case where the capacitor 19 indicates the SOC (for example, a value less than or equal to 45%) corresponding to the discharging requirement value which is zero, the controller 30 drives the swiveling electric motor 21 by only the power generated by the motor generator 12, causes the motor generator 12 to generate the generated power equivalent to the charging requirement value, and charges the capacitor 19 with the generated power. In this way, for example, in a case where the discharging of the capacitor 19 for allowing the motor generator 12 to function as an electric motor increases to cause the load of the engine 11 to be constant increases and the SOC of the capacitor 19 decreases, the controller 30 charges the capacitor 19 even during the swivel power running and prevents overdischarging of the capacitor 19.

Next, another example of the swiveling power-running processing will be described with reference to FIG. 7B.

In addition, FIG. 7B is a flowchart showing the flow of another example of the swiveling power-running processing, and in the case where the swiveling electric motor 21 is in the power-running operation state, the controller 30 repeatedly performs the swiveling power-running processing at a predetermined control period. Moreover, the controller 30 may perform the swiveling power-running processing only once when the swivel power running starts.

First, the controller 30 determines that an output (hereinafter, referred to as a "required output") required for the swivel driving of the swiveling electric motor 21 is less than or equal to the discharging requirement value (Step S11). In the present embodiment, the controller 30 derives the required output from the product of the swivel speed calculated based on the output of the resolver 22 and the swivel torque calculated based on the current flowing through the inverter 20. In addition, the controller 30 compares the required output with the discharging requirement value derived by the requirement value deriving processing.

In a case where it is determined that the required output is less than or equal to the discharging requirement value (YES in Step S11), the controller 30 drives the swiveling electric motor 21 by only the power (discharging power) discharged by the capacitor 19 (Step S12).

Meanwhile, in a case where it is determined that the required output is greater than the discharging requirement value (NO in Step S11), the controller 30 causes the motor generator 12 to function as a generator (Step S13).

In addition, the controller 30 determines whether or not the discharging requirement value is zero (Step S14). Moreover, the discharging requirement value being zero means that the discharging of the capacitor 19 stops.

In a case where it is determined that the discharging requirement value is zero (YES in Step S14), that is, in a case where the discharging of the capacitor 19 stops, the controller 30 drives the swiveling electric motor 21 by only the power (generated power) generated by the motor generator 12 (Step S15).

Thereafter, the controller 30 determines whether or not the discharging requirement value is not zero (Step S16). In the present embodiment, the controller 30 determines whether or not the charging requirement value is zero with reference to the charging requirement value derived by the requirement value deriving processing. In addition, the charging requirement value being zero means that the charging of the capacitor 19 stops.

In a case where it is determined that the charging requirement value is not zero (YES in Step S16), that is, in a case where the charging of the capacitor 19 does not stop, the controller 30 charges the capacitor 19 with the power generated by the motor generator 12 (Step S17). In addition, the motor generator 12 generates the power equivalent to the required output and generates the power equivalent to the charging requirement value during the swivel power running.

In addition, it is determined that the charging requirement value is zero (NO in step S16), the controller 30 ends this time swiveling power-running processing in a state of stopping the charging of the capacitor 19.

Moreover, in a case where it is determined that the discharging requirement value is not zero (NO in Step S14), that is, in a case where the discharging of the capacitor 19 does not stop, the controller 30 drives the swiveling electric motor 21 by the power discharged from the capacitor 19 and the power generated by the motor generator 12 (Step S18).

By repeatedly performing the above-described swiveling power-running processing, as shown in the discharging requirement line DL1 of FIG. 6, in the case where the capacitor 19 indicates the SOC (for example, a value greater than 60%) corresponding to the discharging requirement value which is not zero, if the required output is less than or equal to the discharging requirement value, the controller 30 drives the swiveling electric motor 21 by only the discharging power discharged from the capacitor 19. In addition, in the case where the capacitor 19 indicates the SOC (for example, a value greater than 60%) corresponding to the discharging requirement value which is not zero, if the required output is greater than the discharging requirement value, the controller 30 drives the swiveling electric motor 21 by the power (power equivalent to the discharging requirement value) discharged from the capacitor 19 and the power generated by the motor generator 12. In this way, the controller 30 positively charges the capacitor 19 during the swivel power running, and thereafter, can reliably charge the capacitor 19 with the regenerative power generated during the swivel regeneration.

Moreover, in a case where the capacitor 19 indicates the SOC (for example, a value less than or equal to 60%) corresponding to the discharging requirement value which is zero, the controller 30 drives the swiveling electric motor 21 by only the power generated by the motor generator 12. Moreover, in a case where the capacitor 19 indicates the SOC (for example, a value less than or equal to 45%) corresponding to the discharging requirement value which is zero, the controller 30 drives the swiveling electric motor 21 by only the power generated by the motor generator 12, causes the motor generator 12 to generate the power equivalent to the charging requirement value, and charges the capacitor 19 with the power. In this way, for example, in a case where the discharging of the capacitor 19 for allowing the motor generator 12 to function as an electric motor increases to cause the load of the engine 11 to be constant increases and the SOC of the capacitor 19 decreases, the controller 30 charges the capacitor 19 even during the swivel power running and prevents overdischarging of the capacitor 19.

Figure 8:
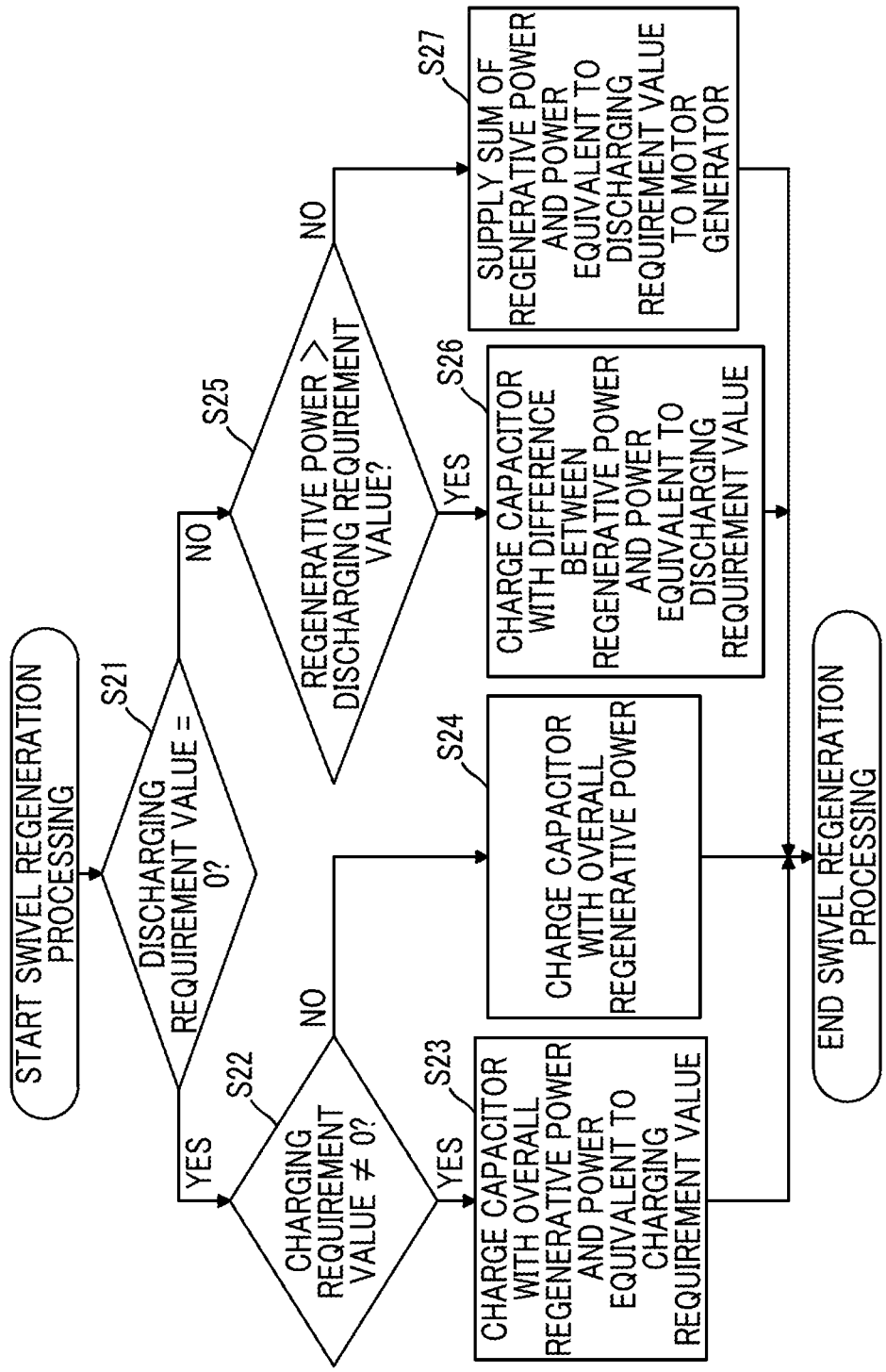
FIG. 8 is a flowchart showing a flow of swivel regeneration processing.

Next, with reference to FIG. 8, processing (hereinafter, referred to as "swivel regeneration processing") for the controller 30 controlling charging and discharging of the capacitor 19 using the charging requirement value and the discharging requirement value in a case where the swiveling electric motor 21 is in the regeneration operation state will be described. In addition, FIG. 8 is a flowchart which shows the flow of the swiveling regeneration processing, and the controller 30 repeatedly performs the swiveling regeneration processing at a predetermined control period in the case where the swiveling electric motor 21 is in the regeneration operation state.

First, the controller 30 determines whether or not the discharging requirement value is zero (Step S21).

In a case where it is determined that the discharging requirement value is zero (YES in S21), that is, in a case where the discharging of the capacitor 19 stops, the controller 30 determines whether or not the charging requirement value is zero (Step S22).

In a case where it is determined that the charging requirement value is not zero (YES in Step S22), that is, the charging of the capacitor 19 does not stop, the controller 30 charges the capacitor 19 with the overall regenerative power regenerated by the swiveling electric motor 21 and the generated power equivalent to the charging requirement value (Step S23).

In addition, in a case where it is determined that the charging requirement value is zero (NO in Step S22), that is, in a case where the charging of the capacitor 19 stops, the controller 30 charges the capacitor 19 with the overall regenerative power regenerated by the swiveling electric motor 21 (Step S24).

In addition, in a case where it is determined that the discharging requirement value is not zero (NO in Step S21), that is, in a case where the discharging of the capacitor 19 does not stop, the controller 30 determines whether or not the regenerative power is greater than the discharging requirement value (Step S25). In addition, in the present embodiment, the regenerative power is indicated by a negative value, and the discharging requirement value is indicated by a positive value. Accordingly, strictly, the controller 30 determines whether or not the absolute value of the regenerative power is greater than the discharging requirement value.

In a case where it is determined that the regenerative power is greater than the discharging requirement value (YES in Step S25), the controller 30 charges the capacitor 19 with a difference between the regenerative power and the power equivalent to the discharging requirement value (Step S26). In the present embodiment, the controller 30 supplies a portion of the regenerative power equivalent to the discharging requirement value from the swiveling electric motor 21 to the motor generator 12 to function the motor generator 12 as an electric motor, and charges the capacitor 19 with the remaining portion of the regenerative power.

Meanwhile, in a case where it is determined that the regenerative power is less than the discharging requirement value (NO in Step S25), the controller 30 applies the sum of the regeneration power and the power equivalent to the discharging requirement value to the motor generator 12 (Step S27). In the present embodiment, the controller 30 supplies the overall regenerative power from the swiveling electric motor 21 to the motor generator 12, and supplies the power equivalent to the discharging requirement value from the capacitor 19 to the motor generator 12 to function the motor generator 12 as an electric motor.

Moreover, in the present embodiment, the power which can be accepted by the motor generator 12 which functions as an electric motor is limited by a predetermined assist limit value. In this case, the assist limit value means the maximum value of the power which can be accepted by the motor generator 12 which functions as an electric motor. The reason why the assist limit value is the maximum value is because it is possible to prevent an assist output from excessively increasing and rotating speed of the engine 11 from increasing. Accordingly, in a case where the sum of the regenerative power and the power equivalent to the discharging requirement value exceeds the power equivalent to the assist limit value, since the power equivalent to the discharging requirement value is decreased by the controller 30, that is, the power discharged from the capacitor 19 is decreased, the power supplied to the motor generator 12 is the same as the power equivalent to the assist limit value.

By repeatedly performing the above-described swivel regeneration processing, as shown by the charging requirement line CL2 of FIG. 6, in a case where the capacitor 19 indicates the SOC (for example, 30%) corresponding to the discharging requirement value which is zero, the controller 30 supplies the overall regenerative power to the capacitor 19 to charge the capacitor 19, generates the power equivalent to the charging requirement value by the motor generator 12, and charges the capacitor 19 by the generated power. In this way, in a case where the SOC of the capacitor 19 is low, the controller 30 causes the motor generator 12 to generate power even when the swivel regeneration is performed so as to charge the capacitor 19, and the controller 30 returns the capacitor 19 to a state where the SOC is high.

In addition, as shown by the discharging requirement line DL2 of FIG. 6, in a case where the capacitor 19 indicates the SOC (for example, a value which is greater than 70%) corresponding to the discharging requirement value which is not zero, if the magnitude of the regeneration power is greater than the magnitude of the discharging requirement value, the controller 30 supplies the power equivalent to the discharging requirement value from the swiveling electric motor 21 to the motor generator 12 to cause the motor generator 12 to function as an electric motor while charging the capacitor 19 with the differential power therebetween. In this way, even in a case where 180° swivel or the like is performed and a great regenerative power is generated, since a portion of the regenerative power is consumed by the motor generator 12, the controller 30 prevents the overcharging of the capacitor 19.

In addition, in a case where the capacitor 19 indicates the SOC (for example, a value which is greater than 70%) corresponding to the discharging requirement value which is not zero, if the magnitude of the regeneration power is less than or equal to the magnitude of the discharging requirement value, until the capacitor reaches the SOC (for example 70%) corresponding to the discharging requirement value which is zero, the sum of the regenerative power and the power equivalent to the discharging requirement value is applied to the motor generator 12 to function the motor generator 12 as an electric motor. In this way, the controller 30 prevents the overcharging of the capacitor 19.

Figure 9:
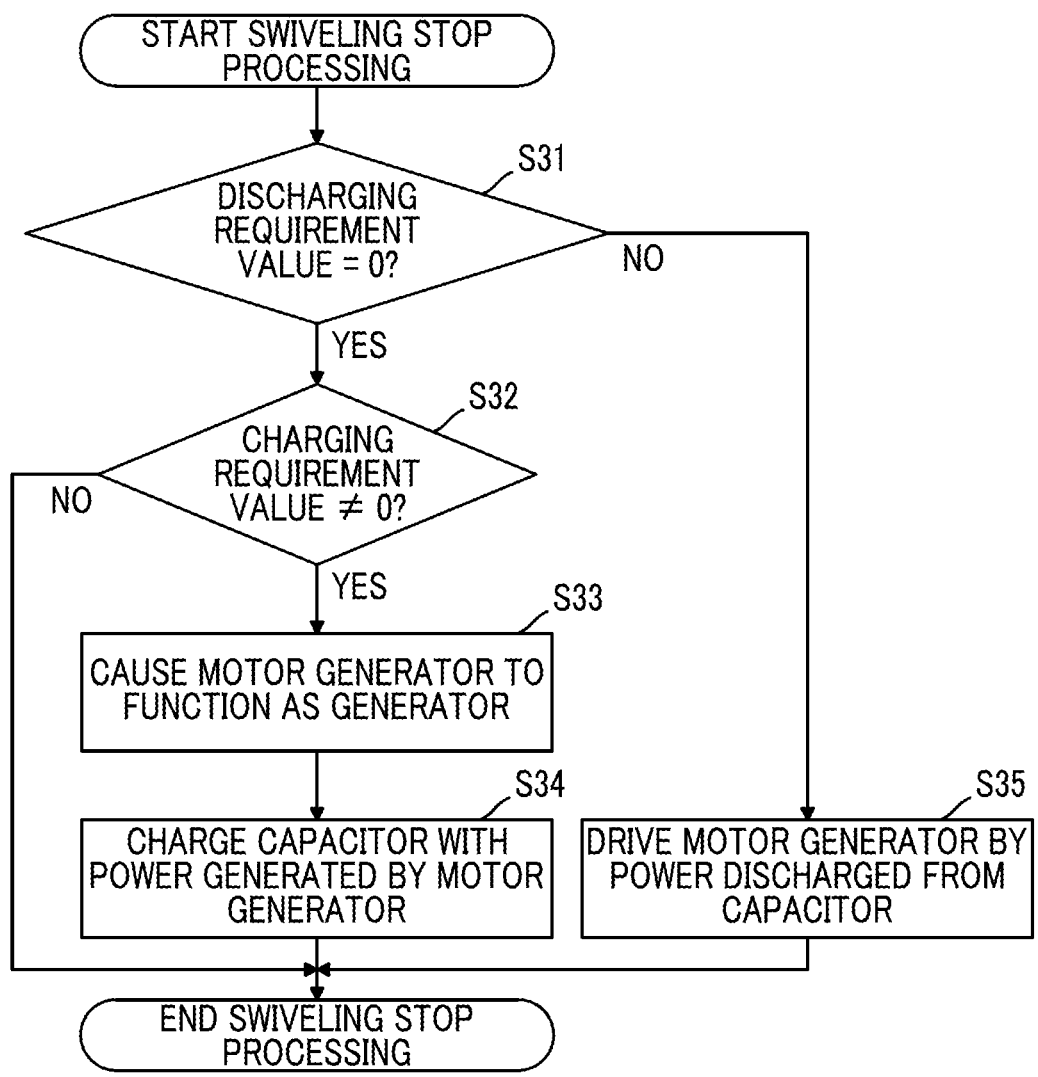
FIG. 9 is a flowchart showing a flow of swiveling stop processing.

Next, with reference to FIG. 9, in a case where the swiveling electric motor 21 is in the stop state, processing (hereinafter, referred to as "swiveling stop processing") for the controller 30 controlling charging and discharging of the capacitor 19 using the charging requirement value and the discharging requirement value will be described. In addition, FIG. 9 is a flowchart showing the flow of the swiveling stop processing, and in the case where the swiveling electric motor 21 is in the stop state, the controller 30 repeatedly performs the swiveling stop processing at a predetermined control period.

First, the controller 30 determines whether or not the discharging requirement value is zero (Step S31).

In a case where it is determined that the discharging requirement value is zero (YES in Step S31), that is, in a case where it is determined that the discharging of the capacitor 19 stops, the controller 30 determines whether or not the charging requirement value is zero (Step S32).

In a case where it is determined that the charging requirement value is not zero (YES in Step S32), that is, in a case where the charging of the capacitor 19 does not stop, the controller 30 causes the motor generator 12 to function as a generator (Step S33). In addition, the controller 30 charges the capacitor 19 with the power generated by the motor generator 12 (Step S34).

In addition, in a case where it is determined that the charging requirement value is zero (NO in Step S32), that is, in a case where the charging of the capacitor 19 stops, the controller 30 does not charge the capacitor 19. Accordingly, the motor generator 12 does not function as a generator for only the charging of the capacitor 19. However, the motor generator 12 functioning as a generator for other objects is not prohibited.

Meanwhile, in a case where it is determined that the discharging requirement value is not zero (NO in Step S31), that is, in a case where the discharging of the capacitor 19 does not stop, the controller 30 drives the motor generator 12 by the power discharged by the capacitor 19 (Step S35).

By repeatedly performing the above-described swiveling stop processing, as shown by the charging requirement line CL3 of FIG. 6, the capacitor 19 indicating the SOC (for example, 30%) corresponding to the charging requirement value which is not zero is charged to the SOC (for example, 60%) corresponding to the charging requirement value which is zero by the controller 30. In this way, for example, in a case where the discharging of the capacitor 19 for allowing the motor generator 12 to function as an electric motor increases to cause the load of the engine 11 to be constant increases and the SOC of the capacitor 19 decreases, the controller 30 charges the capacitor 19 even when swivel stops and prevents the overdischarging of the capacitor 19.

Moreover, as shown by the discharging requirement line DL3 of FIG. 6, the controller 30 discharges the capacitor 19 indicating the SOC (for example, 90%) corresponding to the discharging requirement value which is not zero to the SOC (for example, 70%) corresponding to the discharging requirement value which is zero. In this way, for example, even in a case where the capacitor 19 is frequently charged by increasing opportunity of allowing the motor generator 12 to function as a generator in order to intentionally apply a load to the engine 11 or increasing opportunity of allowing the motor generator 12 to function as an electric motor in order to make the load of the engine 11 be constant, the controller 30 can prevent the SOC of the capacitor 19 from excessively increasing.

In addition, in a case where the capacitor 19 indicates the SOC (for example, 60% or more and 70% or less) in which the charging requirement value and the discharging requirement value are zero, the controller 30 does not charge or discharge the capacitor 19.

According to the above-described configuration, the controller 30 controls the charging and discharging of the capacitor 19 based on the charging requirement value and the discharging requirement value corresponding to the current SOC of the capacitor 19. Accordingly, it is possible to appropriately control the charging and discharging of the capacitor 19.

In addition, the controller 30 changes the charging requirement value and the discharging requirement value according to the state of the swiveling electric motor 21. Accordingly, it is possible to more appropriately control the charging and discharging of the capacitor 19.

Figure 10:
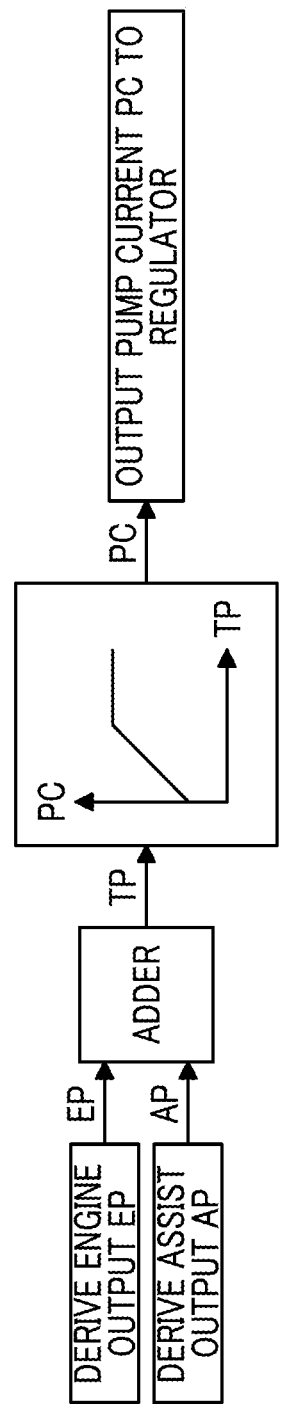
FIG. 10 is a conceptual diagram explaining pump maximum output increasing and decreasing processing.

Next, with reference to FIG. 10, in a case where the motor generator 12 functions as a generator or an electric motor, processing (hereinafter, referred to as "pump maximum output increasing and decreasing processing") for the controller 30 increasing and decreasing the pump maximum output of the main pump 14 will be described. In addition, FIG. 10 is a conceptual diagram explaining the pump maximum output increasing and decreasing processing. In addition, in the present embodiment, the output (absorption horsepower) of the main pump 14 is calculated by the product of an ejection amount and an ejection pressure of the main pump 14.

Specifically, the controller 30 derives an engine output EP. In the present embodiment, the controller 30 receives a detection value of an engine rotating speed sensor (not shown), and derives the engine output EP with reference to an engine rotating speed/engine output correspondence map which is stored in the internal memory in advance.

In addition, the controller 30 derives an assist output AP. In the present embodiment, the controller 30 derives the power transmitted and received between the motor generator 12 and the capacitor 19 as the assist output AP, based on the detection values of a capacitor voltage detecting unit 112 and the capacitor current detecting unit 113. In addition, in the present embodiment, the assist output AP becomes a positive value in a case where the motor generator 12 functions as an electric motor (in a case where the capacitor 19 is discharged), and the assist output AP becomes a negative value in a case where the motor generator 12 function as a generator (in a case where the capacitor 19 is charged).

Thereafter, the controller 30 adds the engine output EP and the assist output AP to derive a total output TP. The total output TP becomes a value which is greater by the assist output AP than the engine output EP in the case where the motor generator 12 functions as an electric motor (in the case where the capacitor 19 is discharged), and the total output TP becomes a value which is smaller by the assist output AP than the engine output EP in the case where the motor generator 12 functions as a generator (in the case where the capacitor 19 is charged).

Thereafter, the controller 30 derives a pump current PC. In the present embodiment, the controller 30 receives the detection value of the engine rotating speed sensor, and derives the pump current PC with reference to a total output/pump current correspondence map corresponding to the engine rotating speed which is stored in the internal memory in advance.

Thereafter, the controller 30 outputs the pump current PC to the regulator (not shown) of the main pump 14. In addition, the regulator is a device which adjusts a swash plate tilt angle of the main pump 14 according to the command from the controller 30 and controls the ejection amount of the main pump 14. In the present embodiment, the regulator decreases the ejection amount of the main pump 14 as the pump current PC decreases.

Accordingly, if the engine rotating speed is constant, that is, if the engine output EP is constant, the controller 30 increases the pump current PC and the pump maximum output of the main pump 14 as the assist output AP increases, that is, as power consumption (discharging amount of the capacitor 19) of the motor generator 12 increases. Since the total output TP increases if the assist output AP increase and there are allowances for the total output TP, the above-described increase in the pump maximum output of the main pump 14 is performed such that the main pump 14 can effectively use the allowances. As a result, the output (absorption horsepower) of the main pump 14 is controlled within a range of the increased pump maximum output.

On the other hand, if the engine rotating speed is constant, that is, if the engine output EP is constant, the controller 30 decreases the pump current PC and the pump maximum output of the main pump 14 as the assist output AP decreases, that is, as electric power generation (charging amount of the capacitor 19) of the motor generator 12 increases. Since the total output TP decreases if the assist output AP decreases and there is a concern that the output (absorption horsepower) of the main pump 14 exceeds the total output TP if the output (absorption horsepower) of the main pump 14 does not decrease, the above-described decrease in the pump maximum output of the main pump 14 is performed. As a result, the output (absorption horsepower) of the main pump 14 is controlled within a range of the decreased pump maximum output.

Figure 11:
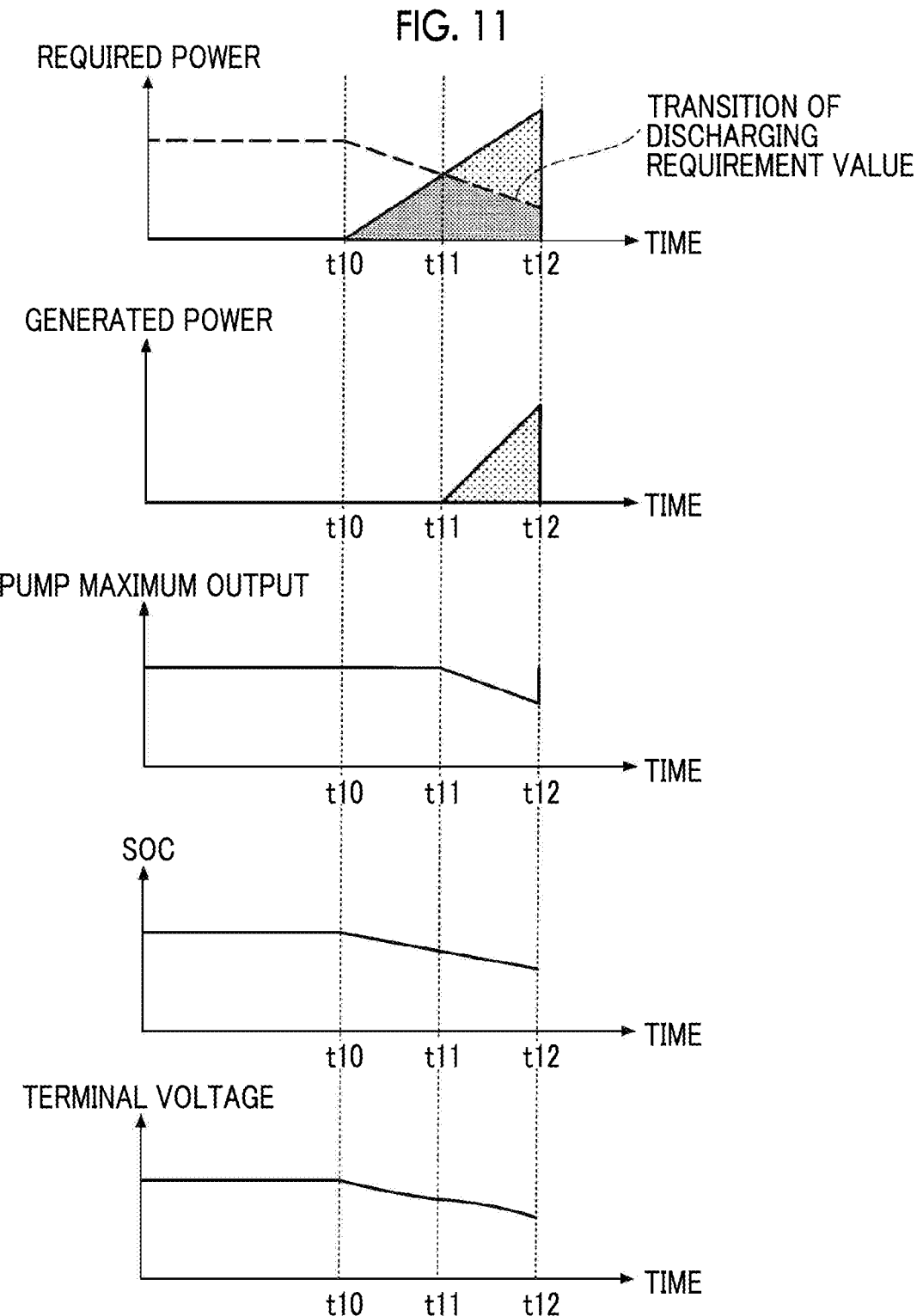
FIG. 11 is a diagram showing temporal transitions of required output, generated power, a pump maximum output, SOC, and a terminal voltage.

Next, with reference to FIG. 11, temporal transitions of the required output of the swiveling electric motor 21, the generated power of the motor generator 12, the pump maximum output of the main pump 14, and the SOC and terminal voltage of the capacitor 19 will be described. FIG. 11 is a diagram showing the temporal transitions of the required output, the generated power, the pump maximum output, the SOC, and the terminal voltage.

At time t10, if the swiveling operation lever is operated, an increase in the required output of the swiveling electric motor 21 starts. The swiveling electric motor 21 swivels the upper swivel body 3 using only the power discharged from the capacitor 19 until the required output exceeds the discharging requirement value. In addition, the SOC and the terminal voltage of the capacitor 19 decrease according to discharging. In addition, as shown by a broken line in FIG. 11, the discharging requirement value decreases as the capacitor 19 continues the discharging, that is, as the SOC decreases.

At time t11, if the required output exceeds the discharging requirement value, the swiveling electric motor 21 swivels the upper swivel body 3 using the power generated by the motor generator 12 in addition to the power discharged from the capacitor 19. Accordingly, the motor generator 12 functions as a generator which uses rotary torque of the engine 11 and the generated power is supplied to the swiveling electric motor 21.

If the power generation of the motor generator 12 starts, since the rotary torque of the engine 11 is absorbed (consumed) by the motor generator 12, the controller 30 decreases the pump maximum output of the main pump 14 by the pump maximum output increasing and decreasing processing.

The generated power of the motor generator 12 increases as the required output of the swiveling electric motor 21 increase, the pump maximum output of the main pump 14 decreases as the generated power of the motor generator 12 increases. In addition, the discharging power of the capacitor 19 decreases as the SOC and the discharging requirement value decrease with the lapse of time. Accordingly, the generated power of the motor generator 12 increases so as to supplement the decrease in the discharging of the capacitor 19. In addition, a coarsely hatched region in the transition diagram of the required output of FIG. 11 indicates the generated power of the motor generator 12 occupying the required output, and a finely hatched region of FIG. 11 indicates the discharging power of the capacitor 19 occupying the required output. In addition, the coarsely hatched region in the transition diagram of the generated power in FIG. 11 indicates the accumulated amount of the generated power, and corresponds to the coarsely hatched region in the transition diagram of the required output of FIG. 11.

Figure 12:
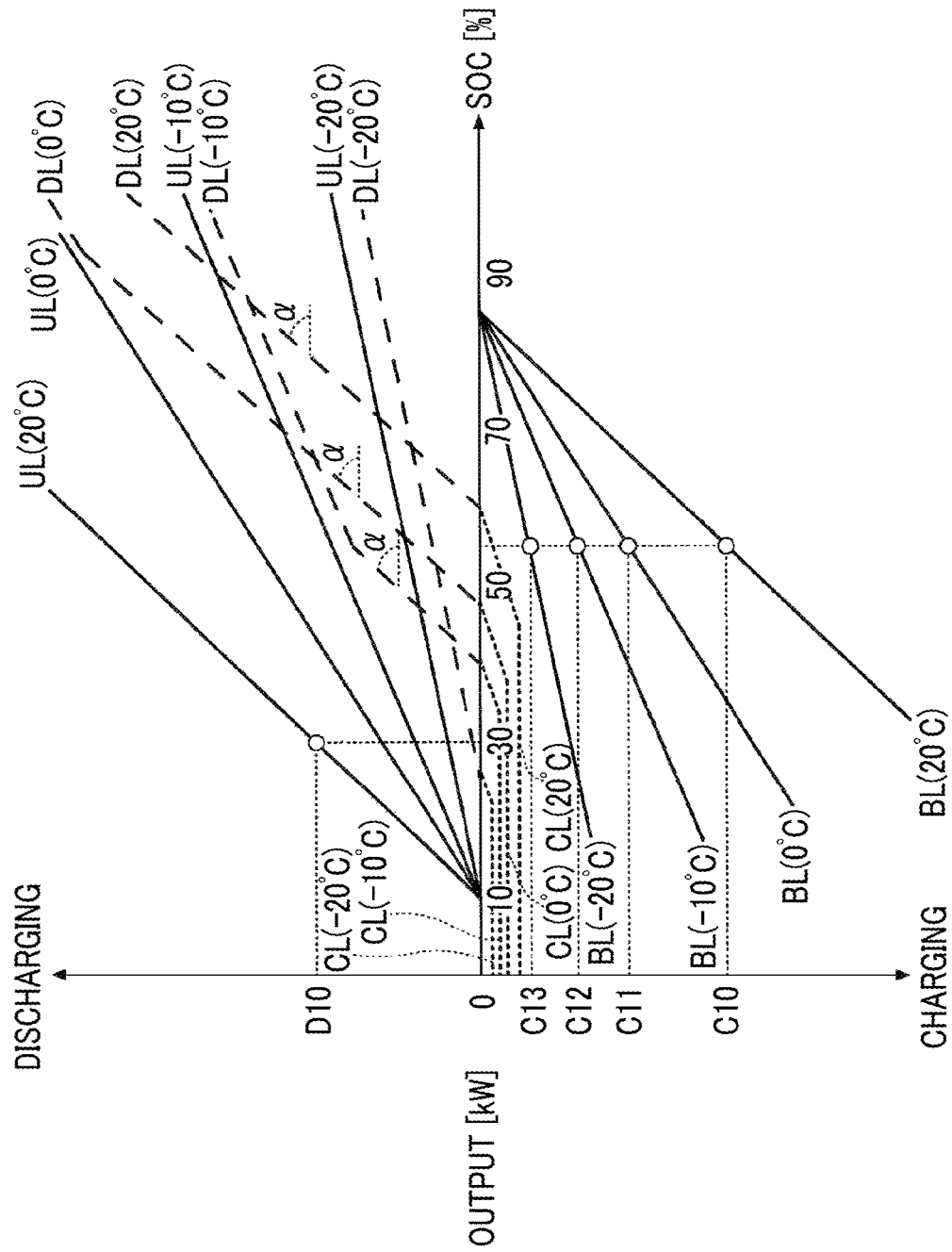
FIG. 12 is a diagram showing another example of the SOC/requirement value correspondence table.

Next, with reference to FIG. 12, processing for the controller 30 adjusting the content of the SOC/requirement value correspondence table according to a capacitor temperature will be described. In addition, FIG. 12 is a diagram showing another example of the SOC/requirement value correspondence table, and corresponds to the FIG. 6. Specifically, FIG. 12 is a graph showing the relationship between the discharging requirement value and the charging requirement value which are adopted in a case where the SOC of the capacitor 19 and the swiveling electric motor 21 are in the power-running operation state, a horizontal axis indicates the SOC[%], and a vertical axis indicates outputs [kW].

In addition, a discharging requirement line DL (20° C.) indicated by a broken line of FIG. 12 shows a transition of the discharging requirement value which is adopted in a case where the swiveling electric motor 21 is in the power-running operation state and the capacitor temperature is 20° C., and is equivalent to the discharging requirement line DL1 of FIG. 6. In addition, a discharging requirement line DL (0° C.) indicated by a broken line shows the transition of the discharging requirement value which is adopted in a case where the capacitor temperature is 0° C. Similarly, a discharging requirement line DL (−10° C.) indicated by a broken line shows the transition of the discharging requirement value which is adopted in a case where the capacitor temperature is −10° C., and a discharging requirement line DL (−20° C.) indicated by a broken line shows the transition of the discharging requirement value which is adopted in a case where the capacitor temperature is −20° C.

In addition, a charging requirement line CL (20° C.) indicated by a dotted line of FIG. 12 shows the transition of the charging requirement value which is adopted in a case where the swiveling electric motor 21 is in the power-running operation state and the capacitor temperature is 20° C., and corresponds to the charging requirement line CL1 of FIG. 6. Moreover, a charging requirement line CL (0° C.) indicated by a dotted line shows the transition of the charging requirement value which is adopted in a case where the capacitor temperature is 0° C. Similarly, a charging requirement line CL (−10° C.) indicated by a dotted line shows the transition of the charging requirement value which is adopted in a case where the capacitor temperature is −10° C., and a charging requirement line DL (−20° C.) indicated by a dotted line shows the transition of the charging requirement value which is adopted in a case where the capacitor temperature is −20° C.

A discharging limit line UL(20° C.) indicated by a solid line of FIG. 12 shows a transition of a discharging limit value in a case where the capacitor temperature is 20° C. The discharging limit value means the maximum value of the power which can be discharged by the capacitor 19, and is used to prevent overdischarging of the capacitor 19. Specifically, the discharging limit value is used to limit the discharging power of the capacitor 19 such that a terminal voltage of the capacitor 19 is not below a predetermined lower limit voltage. In FIG. 12, the discharging power of the capacitor 19 is limited to a value D10 in a case where the SOC is 30 [%], and if the discharging power of the capacitor 19 exceeds the value D10, there is a concern that the terminal voltage may be below the lower limit voltage. In addition, a discharging limit line UL(0° C.) indicated by a solid line shows a transition of a discharging limit value in a case where the capacitor temperature is 0° C. Similarly, a discharging limit line UL(−10° C.) indicated by a solid line shows a transition of a discharging limit value in a case where the capacitor temperature is −10° C., and a discharging limit line UL(−20° C.) indicated by a solid line shows a transition of a discharging limit value in a case where the capacitor temperature is −20° C.

In addition, a charging limit line BL(20° C.) indicated by a solid line of FIG. 12 shows a transition of a charging limit value in a case where the capacitor temperature is 20° C. The charging limit value means the maximum value of the power which can be charged by the capacitor 19, and is used to prevent overcharging of the capacitor 19. Specifically, the discharging limit value is used to limit the charging power of the capacitor 19 such that the terminal voltage of the capacitor 19 does not exceed a predetermined upper limit voltage. In FIG. 12, the charging power of the capacitor 19 is limited to a value C10 in a case where the SOC is 55[%], and if the charging power of the capacitor 19 exceeds the value C10, there is a concern that the terminal voltage may exceed the upper limit voltage. In addition, a charging limit line BL(0° C.) indicated by a solid line shows a transition of a charging limit value in a case where the capacitor temperature is 0° C. Similarly, a charging limit line BL(−10° C.) indicated by a solid line shows a transition of a charging limit value in a case where the capacitor temperature is −10° C., and a discharging limit line BL(−20° C.) indicated by a solid line shows a transition of a charging limit value in a case where the capacitor temperature is −20° C.

Next, effects due to changing the discharging requirement line to be adopted according to the capacitor temperature will be described.

In the example of FIG. 12, the discharging requirement line DL (20° C.) becomes zero in a case where the SOC is 60[%] or less, and increases at a change rate α until the SOC reaches 100[%] after exceeding 60[%]. In addition, the discharging requirement line DL (0° C.) becomes zero in a case where the SOC is 48[%] or less, and increases at a change rate α until the SOC reaches 100[%] after exceeding 48[%]. Moreover, the discharging requirement line DL (−10° C.) becomes zero in a case where the SOC is 40[%] or less, increases at a change rate α until the SOC reaches the discharging limit line after exceeding 40[%], and increases along the discharging limit line UL (−10° C.) after reaching the level of the discharging limit line UL(−10° C.). The discharging requirement line DL (−20° C.) becomes zero in a case where the SOC is 25[%] or less, and increase along the discharging limit line UL(−20° C.) until the SOC reaches 100[%] after exceeding 25[%]. The change rates α of the discharge requirement line DL(20° C.), the discharging requirement line DL(0° C.), and the discharging requirement line DL(−10° C.) with respect to the SOC are the same as each other a region less than or equal to the corresponding discharging limit line.

In this way, by decreasing the SOC (discharging start state-of-charge: discharging start SOC) when the discharging requirement value increases from zero as the capacitor temperature decreases, the controller 30 can decrease the SOC when the power-running operation and the regenerative operation of the swiveling electric motor 21 are performed. For example, specifically, in a case where the capacitor temperature is 20° C., the discharging requirement line DL(20° C.) is adopted, and the SOC of the capacitor 19 transits to a range from 60[%] to 80[%] when the power-running operation and the regenerative operation are performed. Meanwhile, for example, in a case where the capacitor temperature is −20° C., the discharging requirement line DL(−20° C.) is adopted, and the SOC of the capacitor 19 is transited to a range from 25[%] to 45[%] when the power-running operation and the regenerative operation are performed. Accordingly, the controller 30 can prevent the charging power which is the regenerative power generated by the swiveling electric motor 21 when the swivel regeneration is performed from exceeding the charging limit line. Specifically, as shown in FIG. 12, in a case where the SOC is 55[%] when the regenerative operation is performed, if the capacitor temperature is 20° C., the capacitor 19 can accept the charging power having the value C10 while prevent the terminal voltage from exceeding the upper limit voltage. However, if the capacitor temperature is 0° C., since the terminal voltage is prevented from exceeding the upper limit voltage, the capacitor 19 cannot accept charging power which is greater than a value C11. In addition, the capacitor 19 cannot accept charging power which is greater than a value C12 if the capacitor temperature is −10° C., and cannot accept charging power which is greater than a value C13 if the capacitor temperature is −20° C. In this way, the charging power (acceptable charging power) which can be accepted by the capacitor 19 decreases as the capacitor temperature decreases. Meanwhile, the acceptable charging power increases as the SOC decreases. From this relationship, the controller 30 decreases the discharging start SOC as the capacitor temperature decreases, decreases the SOC when the power-running operation and the regenerative operation of the swiveling electric motor 21 are performed, and can prevent the regenerative power (charging power) when the swivel regeneration is performed from exceeding the charging limit line.

In addition, the internal resistance R of the capacitor 19 increases as the capacitor temperature decreases. In addition, since the controller 30 decreases the discharging start SOC as the capacitor temperature decreases, the terminal voltage of the capacitor 19 at the time of charging and discharging decreases. Accordingly, the discharging current which flows to obtain the same discharging power increases, and the charging current which flows to obtain the charging power increases. Accordingly, since the internal resistance R increases and the charging and discharging currents increase as the capacitor temperature decreases, the heating value of the capacitor 19 increases. As a result, it is possible to promote the warming-up of the capacitor 19. In addition, the warming-up of the capacitor 19 is processing which forcedly increases the capacitor temperature by charging and discharging the capacitor 19 in a case where the capacitor temperature is less than or equal to a predetermined temperature. In the present embodiment, the warming-up is realized by charging and discharging the capacitor 19 using the motor generator 12 or the like even during idling of the engine 11 if the shovel is not operated.

On the other hand, the internal resistance R of the capacitor 19 decreases as the capacitor temperature increases. In addition, since the controller 30 increases the discharging start SOC as the capacitor temperature increases, the terminal voltage of the capacitor 19 at the time of charging and discharging also increases. Accordingly, the discharging current which flows to obtain the same discharging power decreases, and the charging current which flows to obtain the same charging power decreases. Therefore, the heating value of the capacitor 19 decreases according to a decrease in the internal resistance R and decreases in charging and discharging currents as the capacitor temperature increases. As a result, heat loss decreases, and it is possible to use the capacitor 19 with high efficiency.

In addition, the controller 30 causes the change rates α of the discharging requirement line DL (20° C.), the discharging requirement line DL (0° C.), and the discharging requirement line DL (−10° C.) with respect to the SOC to be the same as each other within the region of the discharging limit line or less. Accordingly, effects capable of maintaining operation feeling of the shovel regardless of the capacitor temperature are obtained. Specifically, the required output of the swiveling electric motor 21 when the swiveling power runs easily exceeds the discharging requirement value as the change rate α decreases, the power generation performed by the motor generator 12 starts early, and the pump maximum output of the main pump 14 is more early limited. For example, in a case where lifting and swiveling of the boom are performed, a lifting speed of the boom 4 decreases at a stage which is earlier than the swiveling power running. Accordingly, the change rate α being maintained regardless of the capacitor temperature means that the timing when the lifting speed of the boom 4 decreases is not changed. In addition, the change rate α may be set to be relatively increased in a region in which the SOC is relatively high regardless of the capacitor temperature, particularly. The setting is performed in order to increase the discharging power if necessary when the swiveling power runs, and thereafter, to prevent overcharging when the swivel regeneration is performed. Meanwhile, the change rate α is limited by the discharging limit line in order to protect the capacitor 19. For example, if the change rate at the discharging requirement line DL (−20° C.) increases when the capacitor temperature is −20° C., the discharging power at the discharging start SOC exceeds the discharging limit line UL(−20° C.), and overdischarging occurs. Accordingly, the limitation is performed. Therefore, it is necessary to appropriately set the change rate α in consideration of the discharging limit line.

In addition, in FIG. 12, the discharging requirement line DL is set so as to draw a straight line. However, the discharging requirement line DL may be set so as to draw a curve, and may be set so as to draw a folded line.

In FIG. 12, the discharging requirement line DL, the discharging limit line UL, and the charging limit line BL are shown when the capacitor temperatures are 20° C., 0° C., −10° C., and −20° C. However, in actual, the discharging requirement line DL, the discharging limit line UL, and the charging limit line BL are present at predetermined narrow temperature pitches.

Figure 13:
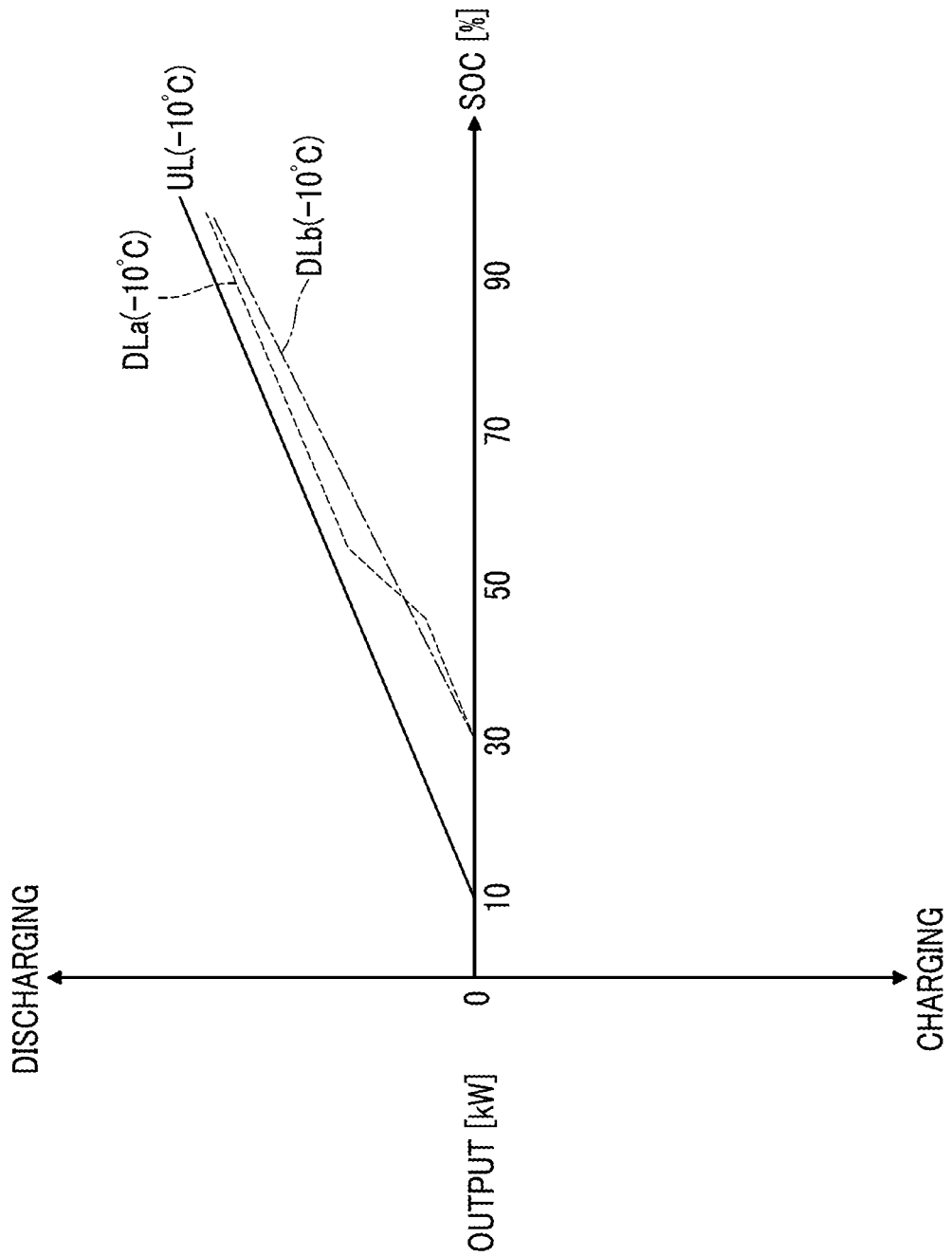
FIG. 13 is a diagram showing another example of a discharging requirement line.

FIG. 13 is a diagram showing another example of the discharging requirement line when the capacitor temperature is −10° C. In addition, in FIG. 13, for simplification, only the discharging limit line UL(−10° C.) and the discharging requirement lines DLa(−10° C.) and DLb(−10° C.) are shown when the capacitor temperature is −10° C., and the discharging limit lines, the discharging requirement lines, and the charging requirement lines at other temperatures are omitted.

The discharging requirement line DLa(−10° C.) shown by a dotted line is an example of a transition which is set to draw a folded line, and increases at a relatively small change rate when the SOC is from 30[%] to 47[%]. In addition, the discharging requirement line DLa(−10° C.) increases at a relatively large change rate until the SOC reaches 55[%], and thereafter, increases at a relatively small change rate until the SOC reaches 100[%]. By adopting this transition, the controller 30 discharges the capacitor 19 at a relatively large discharging power when the SOC is 47[%] to 55[%], and thus, can prevent the terminal voltage of the capacitor 19 when the swivel regeneration is performed after the discharging form exceeding the upper limit voltage.

The discharging requirement line DLb (−10° C.) shown by a dashed line is an example of a transition which is set to draw a straight line without being limited by the discharging limit line UL(−10° C.), and the change rate is not changed when the SOC is from 30[%] to 100[%]. By adopting this transition, unlike the case where the transition is set to draw the folded line, since the discharging requirement value is not rapidly changed by the controller 30 during the swivel power running, it is possible to prevent the operation feeling of the shovel from being rapidly changed.

Figure 14:
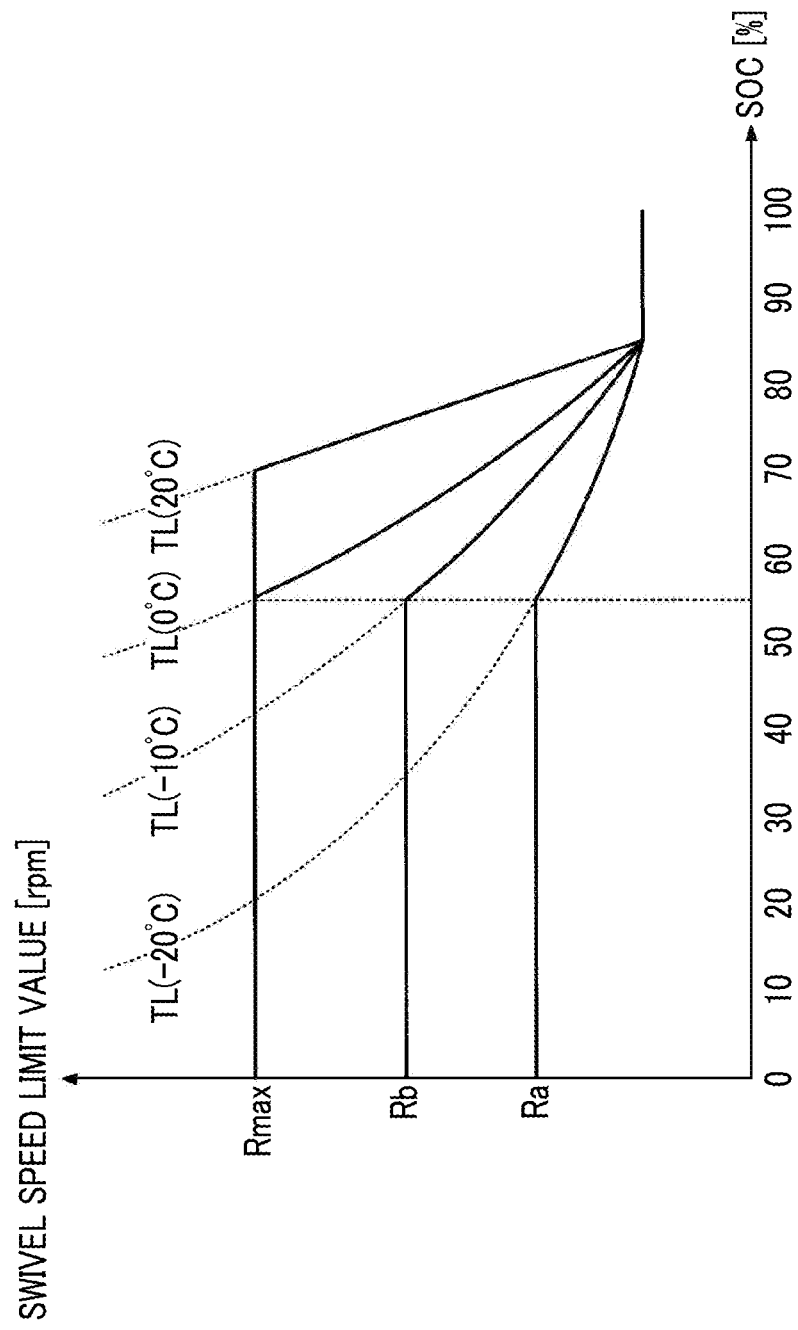
FIG. 14 is a diagram showing a relationship between SOC of a capacitor and a swivel speed limit value.

Next, with reference to FIG. 14, processing for the controller 30 limiting the swivel speed when the swiveling power runs in order to cope with the acceptable charging power which decreases as the SOC of the capacitor 19 increases and the capacitor temperature decreases will be described. Moreover, FIG. 14 is a diagram showing a relationship between the SOC of the capacitor 19 and the swivel speed limit value, and a horizontal axis indicates the SOC[%], and a vertical axis indicates the swivel speed limit value [rpm].

Specifically, the acceptable charging power of the capacitor 19 is determined according to the SOC and the capacitor temperature of the capacitor 19 when the swivel starts. For example, as shown in FIG. 12, if the capacitor temperature is 0° C. and the SOC is 55[%], the acceptable charging power becomes a value C11 with reference to the charging limit line BL (0° C.). If the acceptable charging power is determined, the maximum braking torque which can be realized within the range of the acceptable charging power is determined, and the maximum swivel speed (swivel speed limit value) when the maximum braking torque is required is determined.

In the present embodiment, if the charging limit value is defined as Wcl, the maximum braking torque is defined as Tmax, and the power equivalent to the assist limit value is defined as Wa, a swivel speed limit value Ncl is presented by the following Expression.

$$Ncl = \frac{\frac{Wcl}{\xi_1} + \frac{Wa}{\xi_2}}{T\max} \quad \text{[Expression 2]}$$

In addition, each of $\xi_1$ and $\xi_2$ indicates efficiency. Moreover, for example, the time when the swivel starts means the time when the operation amount of the swiveling operation lever exceeds a predetermined value, the time when the swivel speed reaches a predetermined speed, or the like. In addition, the controller 30 determines the swivel speed limit value each time the swivel starts.

FIG. 14 shows a transition of the swivel speed limit value determined as described above with respect to the SOC. Specifically, a swivel speed limit line TL(20° C.) indicated by a dotted line shows a transition of the swivel speed limit value when the capacitor temperature is 20° C., and a swivel speed limit line TL(0° C.) indicated by a dotted line shows a transition of the swivel speed limit value when the capacitor temperature is 0° C. In addition, a swivel speed limit line TL(−10° C.) indicated by a dotted line shows a transition of the swivel speed limit value when the capacitor temperature is −10° C., and a swivel speed limit line TL(−20° C.) indicated by a dotted line shows a transition of the swivel speed limit value when the capacitor temperature is −20° C.

In addition, in the present embodiment, the swivel speed is electrically or mechanically limited to an upper limit Rmax. Moreover, in a case where the SOC is 55[%] or less and the capacitor temperature is 0° C. or less when the swivel starts, the swivel speed limit value when the SOC is 55[%] is adopted. The swivel speed limit value is adopted to prevent the swivel speed limit value from being changed each time the swiveling operation is performed and the actual maximum swivel speed from being changed. Specifically, the swivel speed limit value is limited to a value Rb in a case where the SOC is 55[%] or less and the capacitor temperature is −10° C. when the swivel starts. In addition, the swivel speed limit value is limited to a value Ra in a case where the SOC is 55[%] or less and the capacitor temperature is −20° C. when the swivel starts. If the SOC/requirement value correspondence table shown in FIG. 12 is adopted, in a case where the capacitor temperature is 0° C. or less, generally, the swivel operation is performed within a range in which the SOC is 55[%] or less. Accordingly, even when the swivel speed limit value is changed along the swivel speed limit line within a range in which the SOC is more than 55[%], the actual maximum swivel speed is not changed each time the swiveling operation is performed.

In this way, the controller 30 limits the maximum swivel speed according to the capacitor temperature. Moreover, the controller 30 gradually releases the limitation of the maximum swivel speed according to the increase of the capacitor temperature.

Figure 15A:
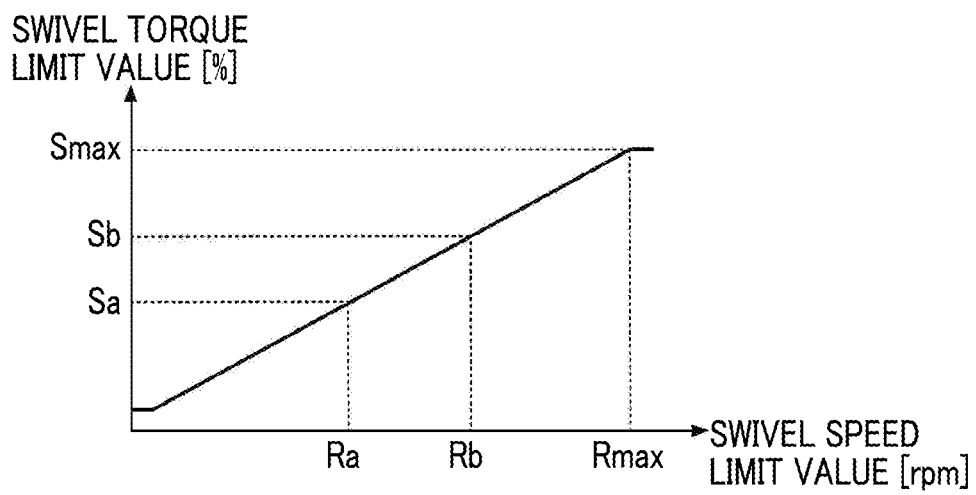
FIG. 15A is a diagram showing a relationship between the swivel speed limit value and a swivel torque limit value.
Figure 15B:
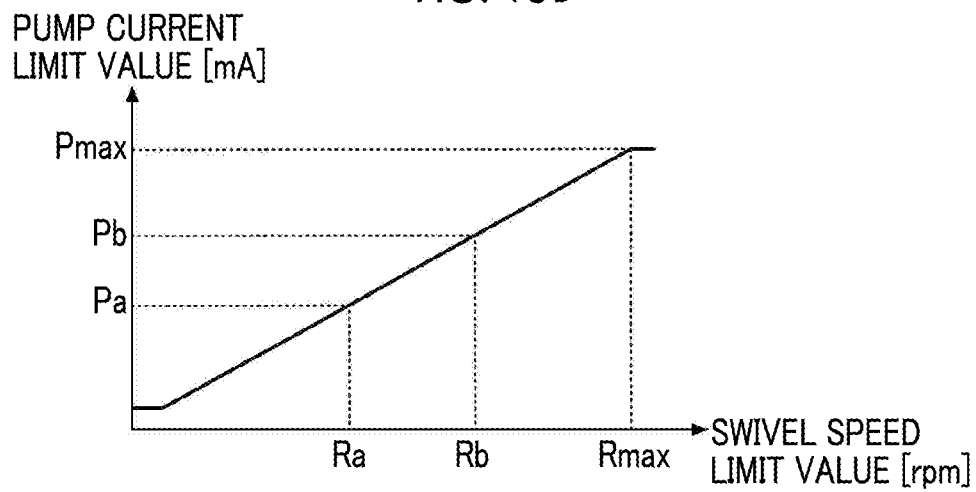
FIG. 15B is a diagram showing a relationship between the swivel speed limit value and a pump current limit value.

Next, with reference to FIGS. 15A and 15B, processing for controller 30 limiting the maximum swivel torque and the pump maximum output of the main pump 14 when the swiveling power runs in accordance with the limitation of the maximum swivel speed will be described. In addition, FIG. 15A is a diagram showing a relationship between the swivel speed limit value and the swivel torque limit value, a horizontal axis indicates the swivel speed limit value [rpm], and a vertical axis indicates the swivel torque limit value [%]. FIG. 15B is a diagram showing a relationship between the swivel speed limit value and the pump current limit value, a horizontal axis indicates the swivel speed limit value [rpm], and a vertical axis indicates the pump current limit value [mA].

For example, in a case where the SOC is 55[%] or less and the capacitor temperature is −10° C. when the swivel starts, the controller 30 limits the swivel speed limit value to a value Rb. In this case, with reference to the correspondence table shown in FIG. 15A, the controller 30 derives a value Sb as the swivel torque limit value. In addition, with reference to the correspondence table shown in FIG. 15B, the controller 30 derives a value Pb as the pump current limit value.

Similarly, in a case where the SOC is 55[%] or less and the capacitor temperature is −20° C. when the swivel starts, the controller 30 limits the swivel speed limit value to a value Ra (<Rb). In this case, the controller 30 derives a value Sa (<Sb) as the swivel torque limit value, and derives a value Pa (<Pb) as the pump current limit value.

In addition, similarly to the swivel speed limit value, the controller 30 determines the swivel torque limit value and the pump current limit value each time the swivel starts.

The limitation of the swivel torque when the swiveling power runs generates the limitation of acceleration of the upper swivel body 3, and the limitation of the pump current generates the limitation of an operation speed of a hydraulic actuator. In addition, thereafter, alleviation of the limitation of the swivel torque due to the increase of the capacitor temperature generates alleviation of the limitation of the acceleration of the upper swivel body 3, and alleviation of the limitation of the pump current generates alleviation of the operation speed of the hydraulic actuator. Accordingly, if the lifting and swiveling of the boom are performed in a case where the swivel speed limit value is limited to be less than the maximum value Rmax, the lifting speed of the boom 4 is limited in accordance with the limitation of the swivel speed. In addition, thereafter, the limitation of the swivel speed is alleviated as the swivel speed limit value increases toward the maximum Rmax due to the increase of the capacitor temperature, and the limitation of the lifting speed of the boom 4 is alleviated in accordance with the alleviation of the limitation of the swivel speed. As a result, the controller 30 can provide the operation speed of the hydraulic actuator matched to the swivel speed to an operating person, and it is possible to prevent the operation feeling from being damaged.

Moreover, in a case where the maximum value Rmax is adopted as the swivel speed limit value, the controller 30 derives a value Smax as the swivel torque limit value and derives a value Pmax as the pump current limit value. That is, in a case where the maximum swivel speed is not limited, the controller 30 does not limit the maximum swivel torque and the pump maximum output.

According to the above-described configuration, the controller 30 decreases the charging limit value and the discharging limit value according to the decrease of the capacitor temperature and changes the discharging requirement value. In present embodiment, the controller 30 decreases the changes of the charging limit value and the discharging limit value with respect to the change of the SOC, and decreases the change of the discharging requirement value with respect to the change of the SOC. Specifically, the controller 30 decreases the limitation values of the discharging limit line UL and the charging limit line BL according to the decrease of the capacitor temperature. In addition, the controller 30 decreases an inclination of the discharging requirement line DL when the swiveling power runs according to the decrease of the capacitor temperature. Accordingly, even in a case where the controller 30 drives the swiveling electric motor 21 in a state where the capacitor temperature is low, it is possible to prevent the overcharging and overdischarging of the capacitor 19. As a result, before the warming-up of the capacitor 19 is completed, the controller 30 can drive the swiveling electric motor 21 without exerting adverse influences on the capacitor 19.

Moreover, the controller 30 decreases the lower limit of the state-of-charge of the capacitor 19 in which the discharging requirement value has a value which is greater than zero, according to the decrease in the capacitor temperature. In the present embodiment, the controller 30 decreases the discharging start SOC according to the decrease in the capacitor temperature. Accordingly, the controller 30 can control the charging and discharging of the capacitor 19 when the swiveling power runs and when the swivel regeneration is performed such that the SOC of the capacitor 19 transits to a lower range as the capacitor temperature decreases. As a result, the controller 30 charges and discharges the capacitor 19 on the conditions that heat is more easily generated as the capacitor temperature decreases, and can promote the warming-up of the capacitor 19. In addition, since the SOC when the swivel regeneration starts is induced to be lower as the capacitor temperature decreases, it is possible to prevent the terminal voltage of the capacitor 19 during the swivel regeneration from reaching the upper limit voltage, and it is possible to prevent the overcharging of the capacitor 19.

In addition, for example, in the above-described embodiment, the controller 30 adjusts the content of the SOC/requirement value correspondence table according to the capacitor temperature in the case where the swiveling electric motor 21 is in the power-running operation state. However, the controller 30 does not adjust the content of the SOC/requirement value correspondence table only in the case where the swiveling electric motor 21 is in the power-running operation state, and the controller 30 may adjust the content of the SOC/requirement value correspondence table according to the capacitor temperature even in a case where the swiveling electric motor 21 is in the regeneration operation state and the stop state.

FIG. 16 is a diagram showing still another example of the SOC/requirement value correspondence table, and corresponds to FIGS. 6 and 12. Specifically, FIG. 16 is a graph showing a relationship between the SOC of the capacitor 19, and the discharging requirement value and the charging requirement value adopted in a case where the swiveling electric motor 21 is in a regeneration operation state.

As shown in FIG. 16, the controller 30 includes not only the SOC/requirement value correspondence table when the swiveling power runs but also the SOC/requirement value correspondence table when the swivel regeneration is performed. In addition, similarly to the case when the swiveling power runs, the controller 30 controls the charging and discharging of the capacitor 19 when the swivel regeneration is performed such that the SOC of the capacitor 19 transits to a lower range as the capacitor temperature decreases.

In addition, although it is not shown, the controller 30 includes a SOC/requirement value correspondence table when the swiveling stops, and similarly to cases when the swiveling power runs and when the swivel regeneration is performed, the controller 30 controls the charging and discharging of the capacitor 19 when the swiveling stops such that the SOC of the capacitor 19 transits to a lower range as the capacitor temperature decreases.

Figure 17:
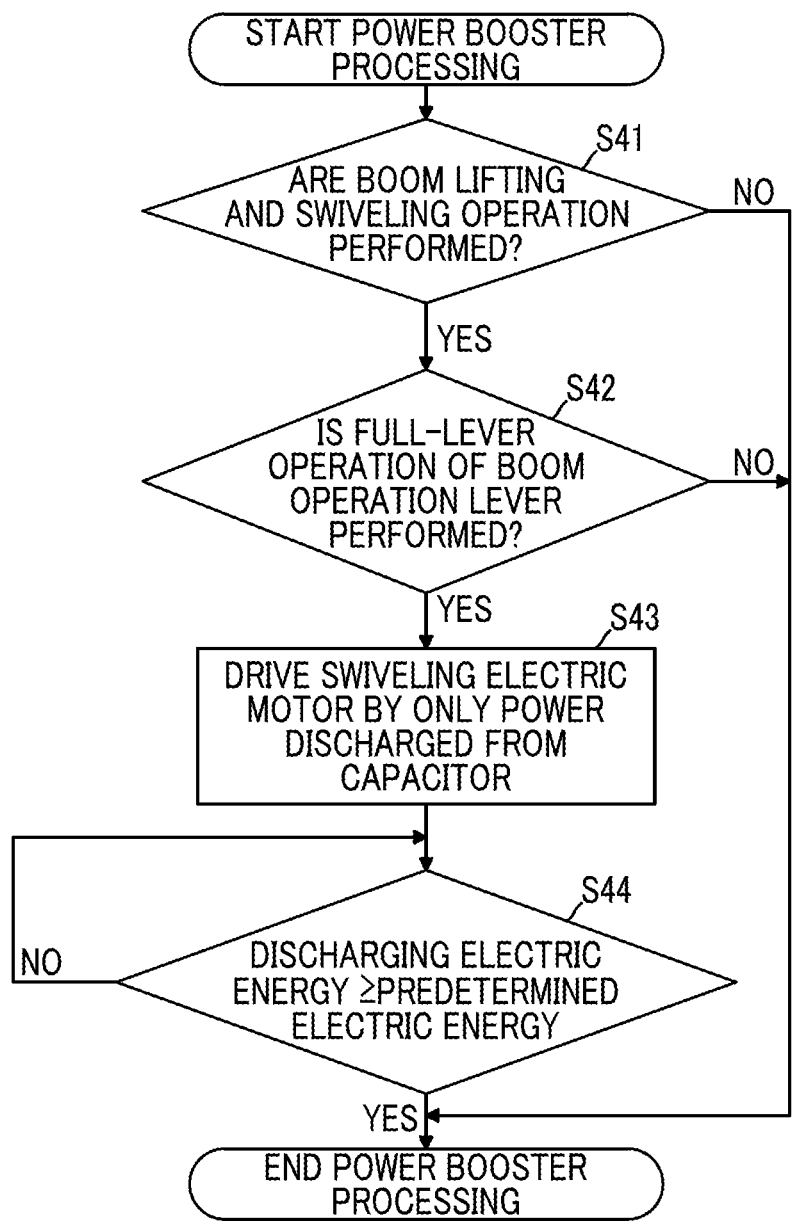
FIG. 17 is a flowchart showing a flow of power booster processing.

Next, with reference to FIG. 17, processing (hereinafter, referred to "power booster processing") for controller 30 discharging the capacitor 19 over the discharging requirement value in a case where a predetermined composite operation is input to the shovel will be described. In addition, FIG. 17 is a flowchart showing the flow of the power booster processing, and the controller 30 repeatedly performs the power booster processing at a predetermined control period in a case where the SOC of the capacitor 19 is within a predetermined range. In the present embodiment, in a case where the SOC of the capacitor 19 is 50% to 70%, the controller 30 repeatedly performs the power booster processing at a predetermined control period. In addition, even in a case where the swiveling power-running processing is performed, the controller 30 performs the power booster processing preferentially.

First, the controller 30 determines whether or not a boom lifting and swiveling operation is performed (Step S41). In the present embodiment, the controller 30 monitors operation contents of the boom operation lever and the swiveling operation lever by monitoring the output of the pressure sensor 29. In addition, in a case where the controller 30 detects that the boom operation lever operates in a lifting direction and the swiveling operation lever is operated in any of the counterclockwise rotation direction and the clockwise rotation direction, the controller 30 determines that the boom lifting and swiveling operation is performed as the composite operation.

In a case where it is determined that the boom lifting and swiveling operation is performed (YES in Step S41), the controller 30 determines whether or not the operation with respect to the boom operation lever is a full-lever operation (Step S42).

The "full-lever operation" is a lever operation which is equal to or more than a predetermined lever operation amount, and in the present embodiment, means that the boom operation lever is inclined in the lifting direction with the lever operation amount of 80% or more. In addition, the lever operation amount indicates 0% when the boom operation lever is positioned at a neutral position, and indicates 100% when the boom operation lever is positioned at the maximum inclination position.

In a case where it is determined that the operation is the full-lever operation (YES in Step S42), the controller 30 drives the swiveling electric motor 21 by the power discharged from the capacitor 19 (Step S43).

This is performed to prevent the lifting speed of the boom 4 from decreasing during the boom lifting and swiveling operation. Specifically, in a case where the SOC decreases (for example, in a case where the regenerative power is not sufficiently obtained when swiveling-pressing work is performed, or in a case where discharging of the capacitor 19 increases so as to perform the assist operation by the motor generator 12) when the swivel power running starts, since power supply amount from the capacitor 19 to the swiveling electric motor 21 is limited if the power booster processing is not performed, the power supply amount from the swiveling electric motor 21 to the swiveling electric motor increases. Accordingly, compared to general swiveling power-running processing (refer to FIG. 7B), the motor generator 12 increases the power generation load of the engine 11, and the output of the engine 11 which can be consumed by the main pump 14 decreases. Accordingly, the ejection amount of the main pump 14 is limited, and an amount of hydraulic oil which flows into the bottom side oil chamber of the boom cylinder 7 is also limited. As a result, the lifting speed of the boom 4 decreases. The power booster processing prevents the lifting speed of the boom 4 from decreasing.

Thereafter, the controller 30 determines whether or not discharging electric energy reaches predetermined electric energy (Step S44). In the present embodiment, the controller 30 monitors the accumulated amount of the power [kW] discharged to the swiveling electric motor 21 by the capacitor 19 when the boom lifting and swiveling operation is performed, that is, discharging electric energy [kJ], and the controller 30 determines whether or not the discharging electric energy [kJ] reaches predetermined electric energy [kJ].

Thereafter, the controller 30 continuously drives the swiveling electric motor 21 by only the power discharged from the capacitor 19 until the discharging electric energy [kJ] reaches the predetermined electric energy [kJ].

In addition, in a case where it is determined that the discharging electric energy [kJ] reaches the predetermined electric energy [kJ] (YES in Step S44), the controller 30 ends the power booster processing. In the present embodiment, predetermined electric energy [kJ] is set such that the controller 30 can end the power booster processing if the boom 4 is lifted by a predetermined angle. Until the swivel regeneration starts after the power booster processing ends, the controller 30 decreases the discharging requirement value when the swivel power running is performed, at the change rate α. In addition, in a case where the required output of the swiveling electric motor 21 exceeds the power equivalent to the discharging requirement value, the difference therebetween is supplied to the motor generator 12. After the swivel regeneration starts, the swiveling regeneration processing is performed, and charging and discharging of the capacitor 19 is controlled based on the charging requirement value and the discharging requirement value. In addition, the change rate α may be the change rate equivalent to the indication of the discharging requirement line DL1 shown by the broken line of FIG. 6.

In addition, in a case where it is determined that the operation with respect to the boom operation lever is not the full-lever operation (NO in Step S42), in the power booster processing, the controller 30 does not drive the swiveling electric motor 21 by only the power discharged from the capacitor 19. This is because an operating person does not intend to rapidly lift the boom 4 and determines that it is not necessary to prevent the decrease in the lifting speed of the boom 4. In this case, the controller 30 performs the swiveling power-running processing or the swiveling regeneration processing according to the state of the swiveling electric motor 21 until the boom lifting and swiveling operation (strictly, swiveling operation) is completed. Accordingly, the swiveling electric motor 21 may be driven by only the power discharged from the capacitor 19. However, the controller 30 may perform the power booster processing even in a case where the operation of the boom operation lever is not the full-lever operation.

Figure 18:
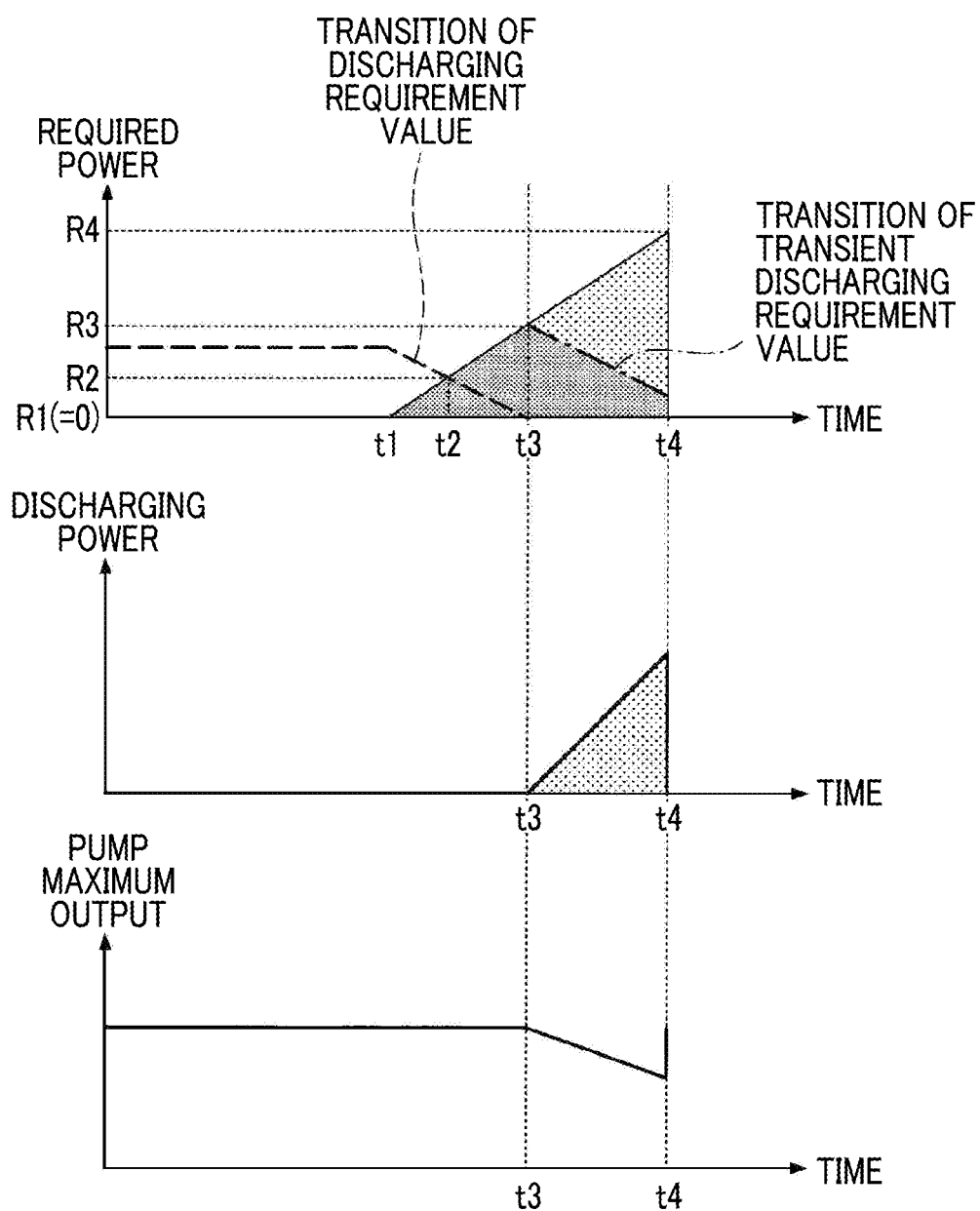
FIG. 18 is a diagram showing temporal transitions of required power, the generated power, and the pump maximum output.
Figure 19:
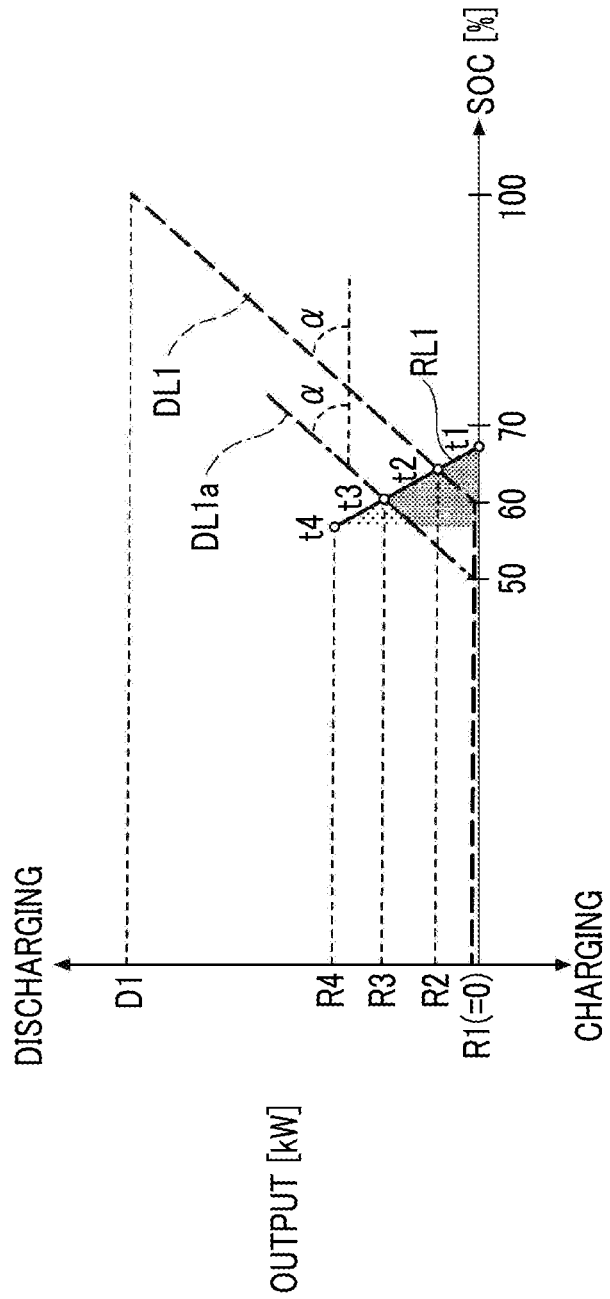
FIG. 19 is a diagram showing a relationship between the SOC of the capacitor and the discharging requirement value.

Next, with reference to FIGS. 18 and 19, temporal transitions of various parameters in a case where the power booster processing and the pump maximum output increasing and decreasing processing are performed will be described. In addition, FIG. 18 is a diagram showing the temporal transitions of the required power of the swiveling electric motor 21, the generated power of the motor generator 12, and the pump maximum output of the main pump 14. Moreover, FIG. 19 is a diagram showing a relationship between the SOC and the discharging requirement value of the capacitor 19, and corresponds to the upper half of FIG. 6. In addition, the discharging requirement line DL1 shown by the broken line indicates the transition of the discharging requirement value with respect to the SOC, which is adopted in a case where the swiveling electric motor 21 is in the power-running operation state. Moreover, a transition RL1 indicated by a solid line shows a temporal transition of the required power of the swiveling electric motor 21 from time t1 to time t4. A coarsely hatched region in the transition diagram of the required power of FIG. 18 indicates the generated power of the motor generator 12 occupying the required power, and a finely hatched region indicates the discharging power of the capacitor 19 occupying the required power. The coarsely hatched region in the transition diagram of the generated power in FIG. 18 indicates the accumulated amount of the generated power, and corresponds to the coarsely hatched region in the transition diagram of the required output. Similarly, the coarsely hatched region in FIG. 19 indicates the generated power of the motor generator 12 occupying the required power, and the finely hatched region indicates the discharging power of the capacitor 19 occupying the required power.

As shown in FIG. 18, at the time t1, if the swiveling operation lever is subjected to the full-lever operation, an increase in the required power of the swiveling electric motor 21 starts. At this time, the controller 30 drives the swiveling electric motor 21 by only the power discharged from the capacitor 19 by the power booster processing. In addition, as shown in FIG. 19, at the time t1, the SOC of the capacitor 19 is a level within a predetermined range (for example, 50[%] to 70[%], approximately 67[%]), and the required power is the level of R1 (=zero).

Thereafter, as shown in FIGS. 18 and 19, even when the required power reaches the discharging requirement value on the discharging requirement line DL1 at the time t2, the controller 30 continuously drives the swiveling electric motor 21 by only the power discharged from the capacitor 19 by the power booster processing. In addition, as shown by the broken line of FIG. 18, the discharging requirement value decreases as the discharging of the capacitor 19 is continued, that is, the SOC decreases. As shown in FIG. 19, at the time t2, the SOC of the capacitor 19 is the level of approximately 65[%], and the required power is the level of R2.

Thereafter, as shown in FIG. 18, at the time t3, if the discharging electric energy which is the accumulated amount of the power which is discharged to the swiveling electric motor 21 by the capacitor 19 reaches predetermined electric energy, the controller 30 ends the power booster processing and starts the swiveling power-running processing. Moreover, as shown in FIG. 19, at the time t3, the SOC of the capacitor 19 is the level of approximately 60[%], and the required power is the level of R3. At this time, the controller 30 adopts a discharging requirement line DL1a shown by the dashed line of FIG. 19 as the transition of a transient discharging requirement value after the power booster processing ends. In addition, the change rate α equivalent to the inclination of the discharging requirement line DL1a is the same as the change rate α of the discharging requirement line DL1. Accordingly, similarly to the discharging requirement value based on the discharging requirement line DL1, as shown by the dashed line of FIG. 18, the transient discharging requirement value based on the discharging requirement line DL1a decreases as the discharging of the capacitor 19 is continued, that is, the SOC decreases.

In addition, if the required power passes the time t3 and exceeds the transient discharging requirement value, the controller 30 allows the motor generator 12 to start the driving as a generator according to the swiveling power-running processing. This is performed to supplement the difference between the required power and the discharging power of the capacitor 19 by the generated power of the motor generator 12. As a result, the controller 30 continuously drives the swiveling electric motor 21 by the power discharged from the capacitor 19 and the power generated by the motor generator 12 by the swiveling power-running processing. At this time, the motor generator 12 functions as a generator which uses the rotary torque of the engine 11, and supplies the generated power to the swiveling electric motor 21. In addition, the swiveling electric motor 21 swivels the upper swivel body 3 using the power generated by the motor generator 12 in addition to the power discharged from the capacitor 19.

If the motor generator 12 starts the power generation, since the rotary torque of the engine 11 is absorbed (consumed) by the motor generator 12, the controller 30 decreases the pump maximum output of the main pump 14 by the pump maximum output increasing and decreasing processing.

Thereafter, as shown in FIG. 19, until the time reaches the time t4, the controller 30 decreases the transient discharging requirement value along the discharging requirement line DL1a as the SOC of the capacitor 19 decreases. Accordingly, as shown in FIG. 18, the discharging power of the capacitor 19 decreases with the lapse of time. In addition, the controller 30 increases the generated power of the motor generator 12 as the difference between the required power and the discharging power of the capacitor 19 increases. The controller 30 decreases the pump maximum output of the main pump 14 by the pump maximum output increasing and decreasing processing as the generated power increases. In addition, as shown in FIG. 19, the SOC of the capacitor 19 is the level of approximately 57[%] immediately before the time t4, and the require power is the level of R4.

Thereafter, at the time t4, if the swiveling operation lever is returned to the neutral position, the required power of the swiveling electric motor 21 becomes zero. At this time, the controller 30 stops the power generation performed by the motor generator 12, and returns the pump maximum output of the main pump 14 to the original level.

Thereafter, the controller 30 performs the swiveling regeneration processing, charges the capacitor 19 with the regenerative power from the swiveling electric motor 21, and causes the motor generator 12 to function as an electric motor by the regenerative power from the swiveling electric motor 21 if necessary.

According to the above-described configuration, the controller 30 drives the swiveling electric motor 21 by the discharging power discharged from the capacitor 19, and thereafter, drives the swiveling electric motor 21 by the power generated by the motor generator 12. Accordingly, even in a case where the composite operation including the swiveling operation and the operation of the hydraulic actuator is performed, in at least an initial step of the composite operation, the motor generator 12 does not function as a generator, and the ejection amount of the main pump 14 being limited is prevented. As a result, in at least the initial step of the composite operation, it is possible to prevent a decrease in the operation speed of the hydraulic actuator while preventing a decrease in the swivel speed.

Specifically, in a case where the swiveling operation is performed, until the discharging power discharged from the capacitor 19 reaches predetermined power (for example, the power equivalent to the discharging requirement value), the controller 30 drives the swiveling electric motor 21 by the discharging power.

Moreover, the controller 30 may drive the swiveling electric motor 21 by the discharging power until a predetermined time elapses after the swiveling operation is performed. The controller 30 may drive the swiveling electric motor 21 by the discharging power until the accumulated amount of the current flowing from the capacitor 19 reaches a predetermined current amount after the swiveling operation is performed. Moreover, the controller 30 may drive the swiveling electric motor 21 by the discharging power until the accumulated amount of the current flowing to the swiveling electric motor 21 reaches a predetermined current amount after the swiveling operation is performed, or until the accumulated amount of the power consumption of the swiveling electric motor 21 reaches predetermined electric energy after the swiveling operation is performed. In addition, the controller 30 may drive the swiveling electric motor 21 by the discharging power until the rotating speed of the swiveling electric motor 21 reaches a predetermined speed after the swiveling operation is performed, or until the swivel speed of the upper swivel body 3 reaches a predetermined speed after the swiveling operation is performed.

In addition, in a case where the controller 30 performs the composite operation including the swiveling operation, until the accumulated amount of the discharging power discharged from the capacitor 19 reaches a predetermined amount, even when the required power exceeds the power equivalent to the discharging requirement value, the controller 30 drives the swiveling electric motor 21 by the discharging power. That is, the power booster processing is continued. Accordingly, even in a case where the boom lifting and swiveling operation is operated, in at least the initial step of the boom lifting and swiveling operation, the motor generator 12 does not function as a generator, and the ejection amount of the main pump 14 being limited is prevented. As a result, in at least the initial step of the boom lifting and swiveling operation, it is possible to prevent a decrease in the lifting speed of the boom 4 while preventing a decrease in the swivel speed. Moreover, for example, the initial step of the boom lifting and swiveling operation is a step until the boom 4 is lifted by a predetermined angle.

In addition, the controller 30 may continue the power booster processing until a predetermined time elapses after the swiveling operation is performed. The controller 30 may continue the power booster processing until the accumulated amount of the current flowing from the capacitor 19 reaches a predetermined current amount after the swiveling operation is performed. Moreover, the controller 30 may continue the power booster processing until the accumulated amount of the current flowing to the swiveling electric motor 21 reaches a predetermined current amount after the swiveling operation is performed, or until the accumulated amount of the power consumption of the swiveling electric motor 21 reaches predetermined electric energy after the swiveling operation is performed. In addition, the controller 30 may continue the power booster processing until the rotating speed of the swiveling electric motor 21 reaches a predetermined speed after the swiveling operation is performed, or until the swivel speed of the upper swivel body 3 reaches a predetermined speed after the swiveling operation is performed.

Moreover, after the accumulated amount reaches the predetermined amount, the controller 30 causes the power generated by the motor generator 12 to be used to drive the swiveling electric motor 21. Accordingly, it is possible to reliably continue the remaining portion of the boom lifting and swiveling operation while preventing the overcharging of the capacitor 19. In this case, the motor generator 12 starts the power generation, and thus, the ejection amount of the main pump 14 is limited, and lifting speed of the boom 4 decreases. However, since the boom 4 is sufficiently lifted already, an operation person does not feel inconvenience.

Moreover, in a case where the swiveling operation is performed, when the SOC of the capacitor 19 is greater than a predetermined value, the controller 30 drives the swiveling electric motor 21 by using the discharging power discharged from the capacitor 19 preferentially over the power generated by the motor generator 12. In addition, when the SOC of the capacitor 19 is less than or equal to a predetermined value, the controller 30 drives the swiveling electric motor 21 by the power generated by the motor generator 12. Accordingly, it is possible to drive the swiveling electric motor 21 while maintaining the SOC of the capacitor 19 to an appropriate level.

Moreover, in a case where the boom lifting and swiveling operation is performed, even when the SOC of the capacitor 19 is less than or equal to a predetermined value, the controller 30 may drive the swiveling electric motor 21 by preferentially using the discharging power discharged from the capacitor 19 by the power booster processing. According to this configuration, in at least the initial step of the boom lifting and swiveling operation, it is possible to it is possible to prevent a decrease in the lifting speed of the boom 4 while preventing a decrease in the swivel speed.

In addition, in a case where the boom lifting and swiveling operation is performed, when the SOC of the capacitor 19 is within a predetermined range, until the accumulated amount of the discharging power discharged from the capacitor 19 reaches a predetermined amount, the controller 30 may drive the swiveling electric motor 21 by the discharging power by the power booster processing. According to this configuration, it is possible to prevent a decrease in the swivel speed and a decrease in the lifting speed of the boom 4 in at least the initial step of the boom lifting and swiveling operation while preventing overcharging of the capacitor 19.

In addition, in a case where the boom lifting and swiveling operation including the swiveling operation and the boom lifting operation performed by the full-lever operation is performed, until the accumulated amount of the discharging power discharged from the capacitor 19 reaches a predetermined amount, the controller 30 may drive the swiveling electric motor 21 by the discharging power by the power booster processing. According to this configuration, in a case where it can be determined that an operating person intends to rapidly lift the boom 4, in at least the initial step of the boom lifting and swiveling operation, it is possible to prevent a decrease in the swivel speed and a decrease in the lifting speed of the boom 4.

Hereinbefore, preferred embodiments of the present invention are described in detail. However, the present invention is not limited to the above-described embodiments, and various modifications and replacements can be applied to the above-described embodiments without departing from the gist of the present invention.

For example, in the above-described embodiment, the controller 30 performs the power booster processing for the boom lifting and swiveling operation. However, the controller 30 may perform the power booster processing for other composite operations including a swiveling operation such as an arm open swiveling operation.

Moreover, multiple SOC/requirement value correspondence tables may be prepared for each temperature. Specifically, a low temperature table which is adopted in a case where a temperature is lower than a predetermined value, and a normal temperature table which is adopted in a case where a temperature is equal to or more than a predetermined value.

It should be understood that the invention is not limited to the above-described embodiment, but may be modified into various forms on the basis of the spirit of the invention. Additionally, the modifications are included in the scope of the invention.

What is claimed is:

1. A shovel comprising:
   a swivel body;
   an engine;
   a motor generator configured to generate electric power and driven by the engine;
   a power storage device configured to store the electric power generated by the motor generator;
   a swiveling electric motor coupled to the motor generator and the power storage device, the swiveling electric motor configure to swivel the swivel body based on electric power provided by at least one of the motor generator and the power storage device; and
   a control device configured to charge electric power to or discharge electric power from the power storage device, wherein the control device is configured to control the power storage device to discharge the electrical power to the swiveling electric motor without providing electric power from the motor generator to the swiveling electric motor during a first time period of a swiveling operation and control the motor generator to provide electric power to the swiveling electric motor to drive the swiveling electric motor during a second time period of the swiveling operation, the second time period subsequent to the first time period.

2. The shovel according to claim 1, wherein the control device is configured to drive the swiveling electric motor by the electric power discharged from the power storage device without using the electric power provided by the motor generator to perform the swiveling operation responsive to an amount of charge in the power storage device being greater than a predetermined value.

3. The shovel according to claim 2, the control device is configured to drive the swiveling electric motor by the electric power discharged from the power storage device to perform a composite operation involving simultaneously performing of the swiveling operation and an operation of a hydraulic actuator even when the amount of charge in the power storage device is less than or equal to the predetermined value.

4. The shovel according to claim 1, the control device is configured to drive the swiveling electric motor by the electric power discharged from the power storage device to perform a composite operation involving simultaneously performing of the swiveling operation and an operation of a hydraulic actuator until an amount of charge in the power storage device reaches a predetermined amount.

5. The shovel according to claim 1, wherein the control device drives the swiveling electric motor by the electric power discharged from the power storage device to perform a full-lever operation that is equal to or more than a predetermined amount of lever operation until an amount of charge in the power storage device reaches a predetermined amount.

6. The shovel according to claim 1, wherein the control device is configured to decrease a charging limit value which is a maximum value of power charged by the power storage device and a discharging limit value which is a maximum value of power discharged from the power storage device, the control device further configured to change a discharging requirement value which is a maximum value of the power supplied from the power storage device to the swiveling electric motor when a temperature of the power storage device is decreased.

7. The shovel according to claim 6, wherein the control device is configured to decrease variations in the charging limit value and the discharging limit value with respect to a change in an amount of charge in the power storage device when a temperature of the power storage device is decreased, the control device further configured to decrease a variation in the discharging requirement value with respect to the change of the amount of charge in the power storage device when the temperature of the power storage device is decreased.

8. The shovel according to claim 6, wherein the control device is configured to decrease a lower limit of an amount of charge in the power storage device at which the discharging requirement value has a greater value than zero when the temperature of the power storage device is decreased.

9. The shovel according to claim 2, wherein the control device is configured to drive the swiveling electric motor by the electric power generated by the motor generator to perform the swiveling operation responsive to the amount of charge in the power storage device being less than or equal to the predetermined value.

* * * * *